(12) United States Patent
Aupperle et al.

(10) Patent No.: US 10,323,845 B2
(45) Date of Patent: *Jun. 18, 2019

(54) AIRFLOW CONTROL AND HEAT RECOVERY IN A MANAGED KILN

(71) Applicant: BIOCHAR NOW, LLC, Loveland, CO (US)

(72) Inventors: Donald P. Aupperle, Seattle, WA (US); Mikel S. Olander, Johnstown, CO (US); Benjamin M. Beierwaltes, Longmont, CO (US); William T. Beierwaltes, Loveland, CO (US); James G. Gaspard, II, Loveland, CO (US)

(73) Assignee: Biochar Now, LLC, Loveland, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/682,289

(22) Filed: Aug. 21, 2017

(65) Prior Publication Data

US 2017/0369785 A1 Dec. 28, 2017

Related U.S. Application Data

(62) Division of application No. 14/384,351, filed as application No. PCT/US2013/030079 on Mar. 9, 2013, now Pat. No. 9,752,078.

(Continued)

(51) Int. Cl.
*C10B 1/02* (2006.01)
*F23G 7/07* (2006.01)
(Continued)

(52) U.S. Cl.
CPC .............. *F23L 17/005* (2013.01); *C10B 1/02* (2013.01); *C10B 49/02* (2013.01); *C10B 53/02* (2013.01);
(Continued)

(58) Field of Classification Search
CPC ..... F23G 5/24; F23G 5/34; F23G 7/07; F24B 1/006; C10B 3/00; C10B 3/02
See application file for complete search history.

(56) References Cited

U.S. PATENT DOCUMENTS

| 414,938 A | 11/1889 | Burcey |
|---|---|---|
| 2,847,369 A | 8/1958 | Hughes et al. |

(Continued)

FOREIGN PATENT DOCUMENTS

| JP | 4267968 | 5/2009 |
|---|---|---|
| KR | 1020020010902 | 2/2002 |

(Continued)

OTHER PUBLICATIONS

International Search Report and the Written Opinion for app. No. PCT/US2016/015943 dated Jun. 9, 2016, 11 pgs.

(Continued)

*Primary Examiner* — David J Laux
(74) *Attorney, Agent, or Firm* — Trenner Law Firm, LLC; Mark D. Trenner

(57) ABSTRACT

A controlled kiln and manufacturing system for biochar production includes control systems and subsystems. An example biochar kiln exhaust apparatus, includes a chimney configured for heating by pyrolysis and for exhausting smoke from the combustion chamber. The example biochar kiln exhaust apparatus also includes a plurality of exhaust inlet pipes configured to pass smoke from the combustion chamber to the chimney.

20 Claims, 27 Drawing Sheets

Related U.S. Application Data

(60) Provisional application No. 61/609,336, filed on Mar. 11, 2012, provisional application No. 61/639,623, filed on Apr. 27, 2012.

(51) Int. Cl.

| | |
|---|---|
| *F23G 7/10* | (2006.01) |
| *F23L 3/00* | (2006.01) |
| *F23L 5/02* | (2006.01) |
| *C10B 49/02* | (2006.01) |
| *C10B 53/02* | (2006.01) |
| *F23B 90/06* | (2011.01) |
| *F23B 90/08* | (2011.01) |
| *F23L 11/02* | (2006.01) |
| *F23L 17/00* | (2006.01) |

(52) U.S. Cl.
CPC .............. *F23B 90/06* (2013.01); *F23B 90/08* (2013.01); *F23G 7/07* (2013.01); *F23G 7/10* (2013.01); *F23L 3/00* (2013.01); *F23L 5/02* (2013.01); *F23L 11/02* (2013.01); *F23L 2700/001* (2013.01); *F23N 2033/04* (2013.01); *Y02E 50/14* (2013.01)

(56) References Cited

U.S. PATENT DOCUMENTS

| | | | |
|---|---|---|---|
| 3,595,181 A | 7/1971 | Anderson et al. | |
| 3,695,192 A | 10/1972 | Von Brimer | |
| 3,777,676 A | 12/1973 | Lagen | |
| 4,117,826 A | 10/1978 | Bette | |
| 4,167,909 A | 9/1979 | Dauvergne | |
| 4,261,269 A | 4/1981 | Mallek et al. | |
| 4,419,942 A | 12/1983 | Johnson | |
| 4,810,385 A | 3/1989 | Hater et al. | |
| 5,014,680 A * | 5/1991 | Siemer .................... | F23B 7/005 |
| | | | 110/214 |
| 5,018,458 A | 5/1991 | McIntyre et al. | |
| 5,160,259 A | 11/1992 | O'Hara et al. | |
| 5,190,901 A | 3/1993 | Hirai | |
| 5,499,622 A | 3/1996 | Woods | |
| 5,770,079 A | 6/1998 | Haase | |
| 5,799,590 A * | 9/1998 | Noguchi ................ | F23G 5/245 |
| | | | 110/165 R |
| 5,968,320 A | 10/1999 | Sprague | |
| 6,484,714 B1 | 11/2002 | Smith | |
| 6,790,317 B2 | 9/2004 | Antal, Jr. | |
| 7,354,557 B2 | 4/2008 | Muramatsu | |
| 7,371,308 B1 | 5/2008 | Hackl | |
| 7,381,333 B1 | 6/2008 | Rainer | |
| 7,399,458 B1 | 7/2008 | Martin | |
| 7,458,809 B2 | 12/2008 | Hohenshelt et al. | |
| 7,678,176 B2 | 3/2010 | Whitten et al. | |
| 8,100,990 B2 | 1/2012 | Ellens et al. | |
| 8,287,728 B2 | 10/2012 | Kania et al. | |
| 8,361,186 B1 | 1/2013 | Shearer et al. | |
| 8,419,812 B2 | 4/2013 | Ershag | |
| 8,512,644 B1 | 8/2013 | Maganas | |
| 8,673,150 B2 | 3/2014 | Pearson | |
| 8,747,797 B2 | 6/2014 | Shearer et al. | |
| 8,812,162 B2 | 8/2014 | Schneider et al. | |
| 8,986,507 B2 | 3/2015 | Schottdorf | |
| 9,139,790 B2 | 9/2015 | Taniguro et al. | |
| 9,321,966 B2 | 4/2016 | Wang | |
| 9,725,371 B2 | 8/2017 | Shearer et al. | |
| 9,752,078 B2 | 9/2017 | Aupperle et al. | |
| 9,878,301 B1 | 1/2018 | Kinsman et al. | |
| 9,878,924 B2 | 1/2018 | Beierwaltes et al. | |
| 9,975,792 B2 | 5/2018 | Thorgersen et al. | |
| 2003/0024165 A1 | 2/2003 | Antal, Jr. | |
| 2003/0034286 A1 | 2/2003 | Butler | |
| 2003/0136734 A1 | 7/2003 | Mirzayi et al. | |
| 2004/0178052 A1 | 9/2004 | Antal, Jr. | |
| 2005/0051918 A1 | 3/2005 | Muramatsu | |
| 2008/0223269 A1 | 9/2008 | Paoluccio | |
| 2009/0211892 A1 | 8/2009 | Cunningham | |
| 2009/0215375 A1 | 8/2009 | Hagensen | |
| 2010/0031571 A1 | 2/2010 | Ershag | |
| 2010/0120128 A1 | 5/2010 | Liang | |
| 2011/0100272 A1 | 5/2011 | Hasselbring et al. | |
| 2011/0114144 A1 | 5/2011 | Green et al. | |
| 2011/0172092 A1 | 7/2011 | Lee et al. | |
| 2011/0252699 A1 | 10/2011 | Shepard | |
| 2012/0079762 A1 | 4/2012 | Schottdorf | |
| 2012/0116589 A1 | 5/2012 | Schneider et al. | |
| 2012/0193212 A1 | 8/2012 | Taniguro et al. | |
| 2012/0237994 A1 | 9/2012 | Das et al. | |
| 2012/0304718 A1 | 12/2012 | Cheiky et al. | |
| 2012/0305380 A1 | 12/2012 | Wang | |
| 2013/0068690 A1 | 3/2013 | McCord et al. | |
| 2013/0341175 A1 | 12/2013 | Linden et al. | |
| 2013/0341176 A1 * | 12/2013 | Pereira Filho ............ | B09B 3/00 |
| | | | 201/27 |
| 2014/0151296 A1 | 6/2014 | Moore et al. | |
| 2014/0323297 A1 | 10/2014 | Harman et al. | |
| 2015/0040804 A1 | 2/2015 | Aupperle | |
| 2015/0136581 A1 | 5/2015 | Aupperle | |
| 2015/0144564 A1 | 5/2015 | Moller et al. | |
| 2015/0219341 A1 | 8/2015 | Yun | |
| 2015/0237813 A1 | 8/2015 | Field | |
| 2016/0229709 A1 | 2/2016 | Beierwaltes | |
| 2016/0075567 A1 | 3/2016 | Tour et al. | |
| 2016/0211041 A1 | 7/2016 | Maganas | |
| 2017/0055502 A1 | 3/2017 | Gagliano et al. | |
| 2017/0283703 A1 | 10/2017 | Olander et al. | |
| 2017/0283704 A1 | 10/2017 | Olander et al. | |
| 2018/0072953 A1 | 3/2018 | Aupperle et al. | |
| 2018/0072954 A1 | 3/2018 | Aupperle et al. | |
| 2018/0105437 A1 | 4/2018 | Beierwaltes et al. | |
| 2018/0327329 A1 | 11/2018 | Bontchev et al. | |

FOREIGN PATENT DOCUMENTS

| | | |
|---|---|---|
| WO | WO 2006117006 | 11/2006 |
| WO | WO 2010122525 | 10/2010 |
| WO | WO 2010129996 | 11/2010 |
| WO | WO 2011097183 | 8/2011 |
| WO | WO 2011143718 | 11/2011 |
| WO | WO 2012061795 | 5/2012 |
| WO | WO 2013126477 | 8/2013 |
| WO | WO 2013152337 | 10/2013 |
| WO | WO 2014059141 | 4/2014 |
| WO | WO 2014170670 | 11/2014 |
| WO | WO 2014179670 | 11/2014 |

OTHER PUBLICATIONS

International Search Report and the Written Opinion for app. No. PCT/US2013/025999 dated Jun. 12, 2013, 8 pgs.
International Search Report and the Written Opinion for app. No. PCT/US2013/030079 dated Jun. 18, 2013, 9 pgs.
English abstract for JP No. 4267968 dated May 27, 2009, 2 pgs.
International Preliminary Report on Patentability for International Application No. PCT/US2013/030079, dated Aug. 19, 2014, 5 pp.
International Preliminary Report on Patentability for International Application No. PCT/US2013/025999, dated Aug. 19, 2014, 5 pp.
Machine Translation of KR-10-2002-0010902, obtained from KIPRIS, dated Feb. 6, 2002, 83 pp.
International Preliminary Report on Patentability for International Application No. PCT/US2016/015943, dated Aug. 8, 2017, 7 pp.
Co-owned U.S. Appl. No. 15/997,418, filed Jun. 4, 2018.
Co-owned U.S. Appl. No. 15/997,440, filed Jun. 4, 2018.
Co-owned U.S. Appl. No. 15/997,367, filed Jun. 4, 2018.
Co-owned U.S. Appl. No. 16/149,789, filed Oct. 2, 2018.
Sugarman, Joe, "Is It Safe to Swim in the Chesapeake Bay?", Washingtonian Magazine, Jun. 28, 2016 (downloaded Dec. 31, 2018), 21 pages, Washington, D.C.
Greenyarn—Technology in Nature, www.greenyarn.com, Copyright 2005 (downloaded Dec. 31, 2018), 5 pages, Greenyarn LLC, Boston, Massachusetts.

(56) References Cited

OTHER PUBLICATIONS www.reddit.com, "Are you supposed to wear underwear under swim trunks?", blog conversation dated 2015 (downloaded Dec. 31, 2018), 8 pages.

Schmidt, Hans-Peter, "Novel Uses of Biochar—a key technology for the future of the planet," downloaded from https://scholarworks.umass.edu/biochar/2013/Benefits/7/ (downloaded Dec. 31, 2018), 106 pages.

USEPA technical report "Toxic Contaminants in the Chesapeake by and Its Watershed; Extent and Severity of Occurrence and Potential Biological Effects," Technical Report Dec. 2012, p. 44-59, Annapolis, Maryland.

Yao, Ying, et al., "Effect of biochar amendment on sorption and leaching of nitrate, ammonium, and phosphate in a sandy soil," Chemosphere, 2012, pp. 1467-1471, vol. 89, Elsevier, Gainesville, Florida.

Wang, Zhanghong, et al. Biochar produced from oak sawdust by Lanthanum (La)-involved pyrolysis for adsorption of ammonium ($NH4+$), nitrate ($NO3-$), and phosphate ($PO3/4-$), Chemosphere, 2015, pp. 646-653, vol. 119, Elsevier, China.

\* cited by examiner

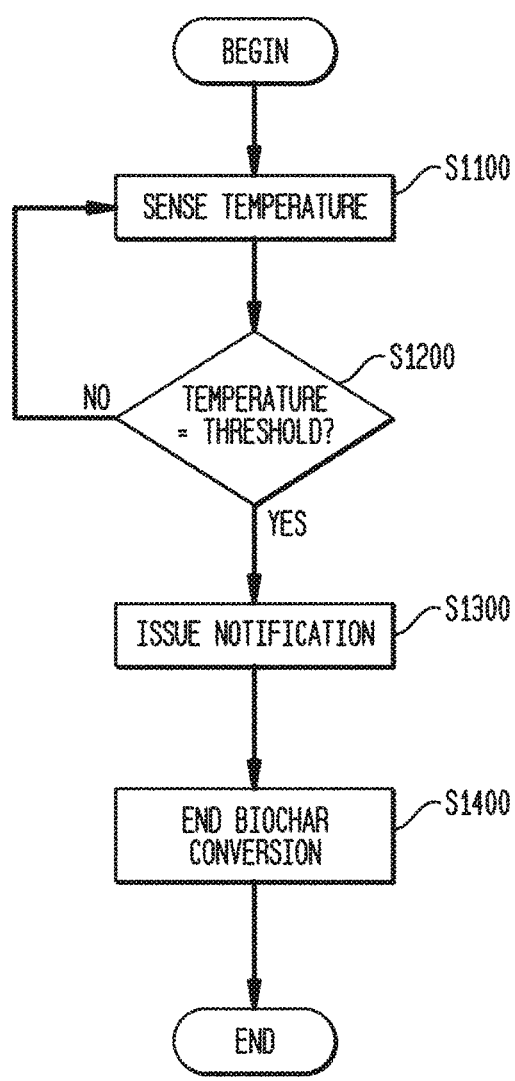

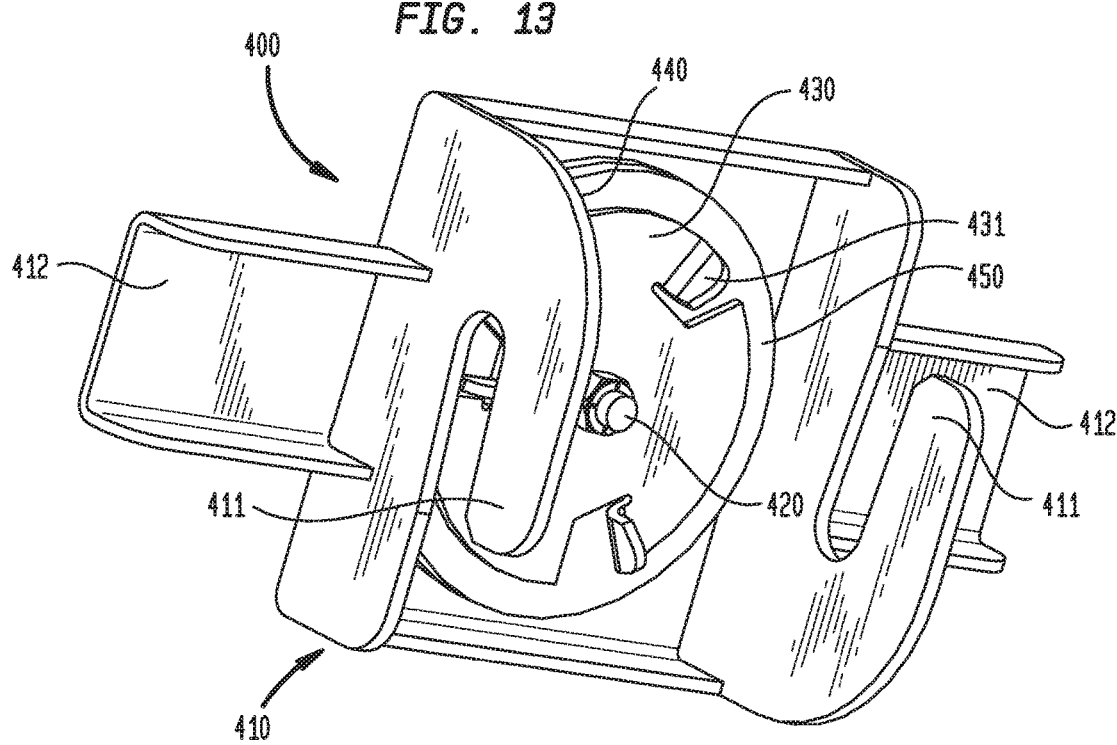
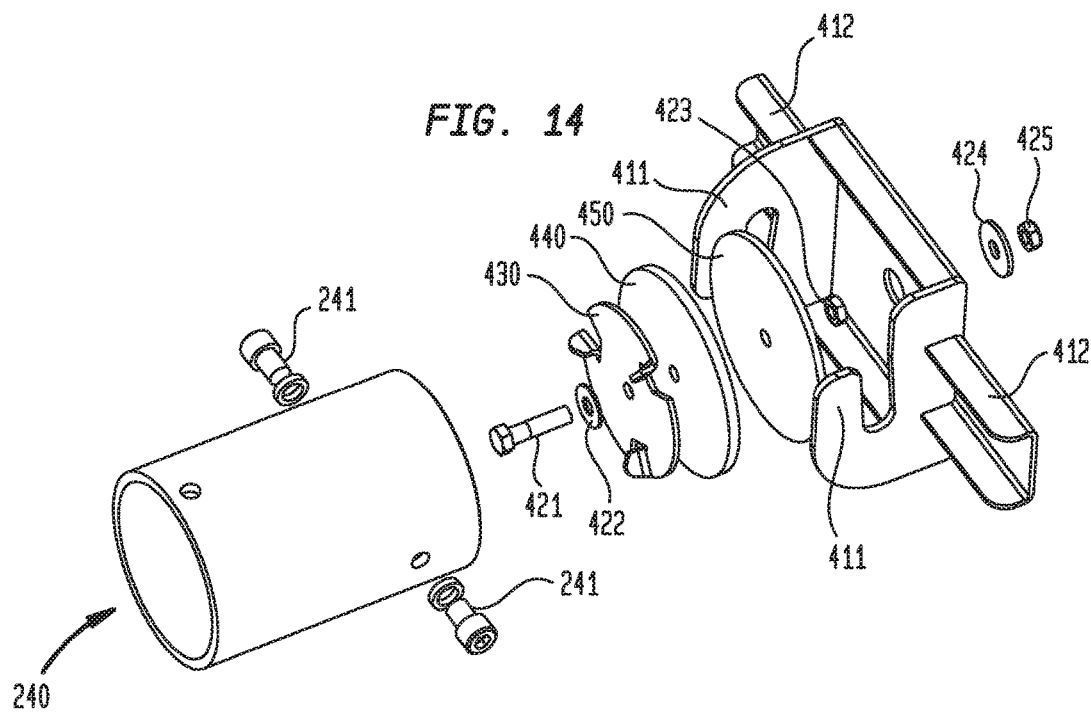

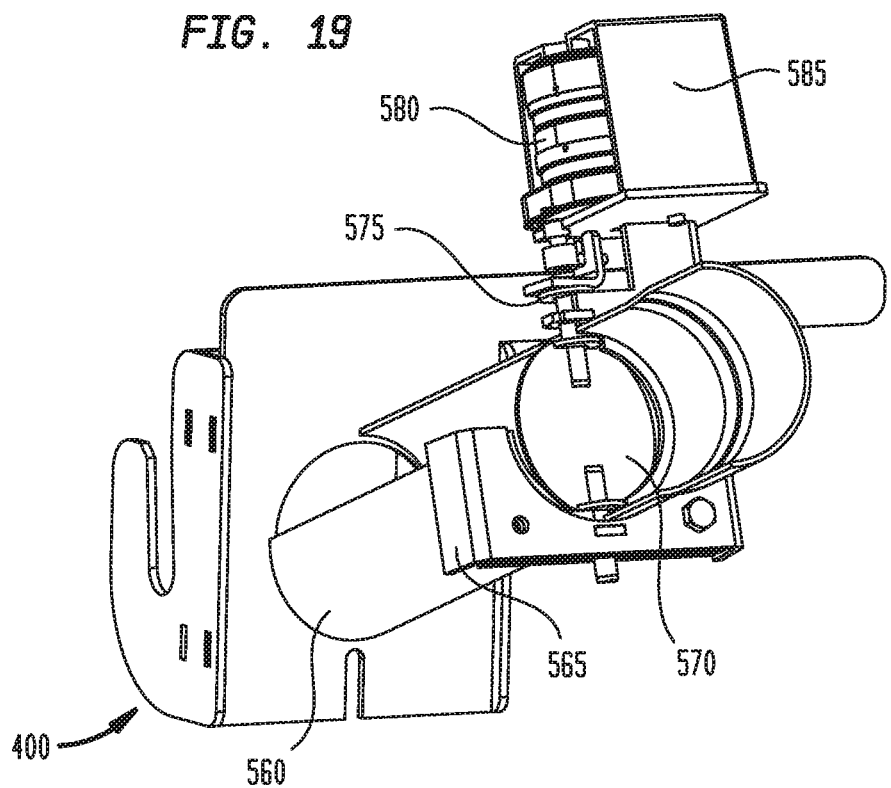
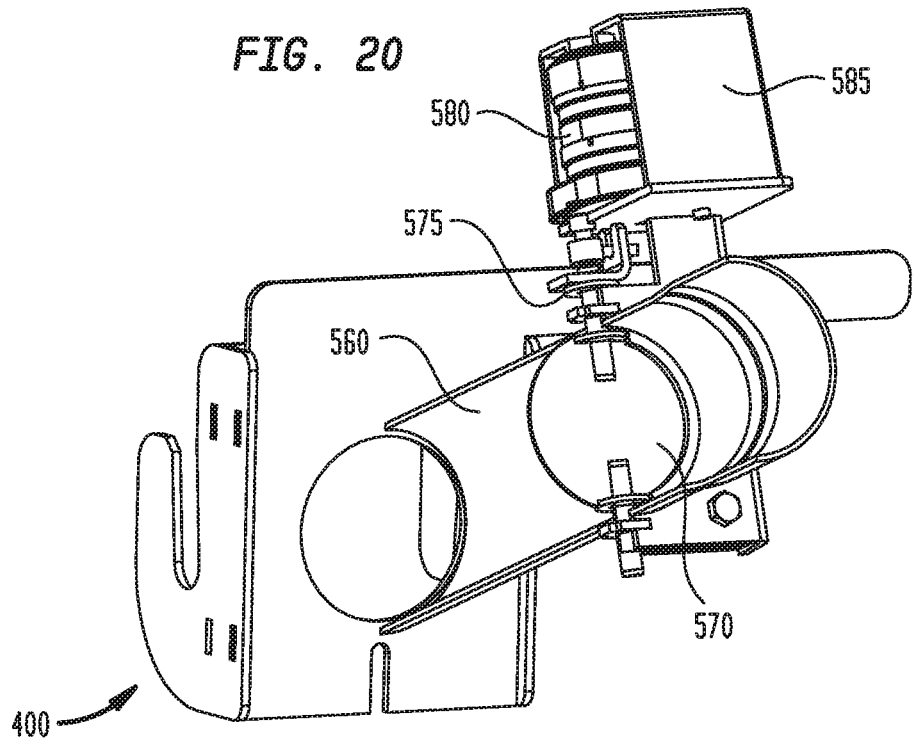

AIRFLOW CONTROL AND HEAT RECOVERY IN A MANAGED KILN

PRIORITY CLAIM

This application is a divisional of U.S. patent application Ser. No. 14/384,351 filed Sep. 10, 2014 titled "Airflow Control and Heat Recovery In A Managed Kiln" of Aupperle et al., which is a 371 National Stage Entry of PCT Patent Application No. PCT/US13/30079, which claims the priority benefit of U.S. Provisional Patent Application Nos. 61/609,336 filed Mar. 11, 2012 for "Ventilation and exhaust system for a biochar kiln" and 61/639,623 filed Apr. 27, 2012 for "Biochar heat recovery process." This application is also related to PCT Patent Application No. US13/25999 filed Feb. 13, 2013 for "Controlled kiln and manufacturing system for biochar production" as a continuation-in-part patent application in the United States and any other country whose patent law recognizes CIP status; the PCT Patent Application further claims the priority benefit of U.S. Provisional Patent Application Nos. 61/599,906 filed Feb. 16, 2012 for "Biochar kiln with catalytic converter," 61/599,910 filed Feb. 16, 2012 for "Process completion detection for biochar kiln," and 61/604,469 filed Feb. 28, 2012 for "Biochar manufacturing process." Each of the applications cited above are incorporated by reference in their entirety as though fully set forth herein.

BACKGROUND

Biochar is made from biomass (trees, agricultural waste, etc.) in an oxygen-deprived, high temperature environment. Quality biochar has high purity, absorptivity and cation exchange capacity which provide significant benefits to several large markets including agriculture, pollution remediation, odor sequestration, separation of gases, oil and gas clean up, and more.

SUMMARY

Airflow control and heat recovery in a managed kiln is disclosed. In an example, a ventilation and exhaust system for a biochar kiln comprises a plurality of air inlet ports around an outer circumference of a combustion chamber. A chimney is configured for heating by pyrolysis and for exhausting smoke from the combustion chamber. A plurality of exhaust inlet pipes are configured to pass smoke from the combustion chamber to the chimney. A controller is configured to regulate the exhausting based upon output from one or more sensors.

The example system may further comprise at least one catalytic converter configured to reduce emissions from smoke exhausting through the chimney. Port covers may be configured to open and close the air inlet ports to respectively allow air to enter the combustion chamber and prevent air from entering the combustion chamber. The port covers may have cams configured to compress port cover seals against the air inlet ports with rotation in a first direction. Flow regulation assemblies may be coupled with the port covers and wherein the flow regulation assemblies include blowers. The controller is configured to independently operate a plurality of valves to regulate flow through the air inlet ports based upon the output from the one or more sensors.

In another example, a biochar kiln exhaust apparatus, comprises a chimney configured for heating by pyrolysis and for exhausting smoke from the combustion chamber. A plurality of exhaust inlet pipes are configured to pass smoke from the combustion chamber to the chimney. At least one catalytic converter may be operatively coupled with the chimney for reducing emissions from smoke exhausting through the chimney. A damper assembly may be coupled with the chimney and configured to regulate exhaust flow. A first forced air inlet may be operatively coupled with the chimney to control operating condition(s) of the at least one catalytic converter. A second forced air inlet may be operatively coupled with the chimney to control operating condition(s) of the at least one catalytic converter. The first and second forced air inlets may be used one instead of the other and/or in combination with other air inlets and/or other air flow controls.

In another example, a heat recovery system may comprise at least one biochar kiln having a combustion chamber. A chimney having proximal and distal ends is configured to exhaust smoke from the combustion chamber between the proximal and distal ends. A heat exchanger may be configured to recover heat from the chimney and provide the heat to a secondary subsystem. The secondary subsystem can be, by way of non-limiting example, one or more of an oil sands production water heater, a building heater or a water condenser. A controller may be configured to maintain an optimal mixture of smoke and air in the chimney.

The heat recovery system may comprise at least one catalytic converter operatively coupled with the chimney to incinerate exhaust and increase chimney temperature near the distal end. At least one sensor may be configured to provide information about operating conditions to the controller. The at least one sensor may be configured to sense at least one of: an exhaust temperature, a catalytic converter temperature and a heat exchanger temperature.

In another example, a heat recovery apparatus comprises a chimney configured to exhaust air and smoke from a biochar kiln combustion chamber. At least one catalytic converter is operatively coupled with the chimney to reduce exhaust smoke emissions. A heat exchanger is configured to recover heat from the chimney and provide the heat to a secondary application. The heat exchanger may be configured to exchange heat from one volume of air to another volume of air. The heat exchanger may be configured to exchange heat from a volume of air to a volume of liquid. The heat exchanger may be configured to exchange heat from a volume of air to a volume of steam.

BRIEF DESCRIPTION OF THE DRAWINGS

FIG. 12 illustrates an example flow diagram of a process for monitoring and controlling conversion of feedstock into biochar.

FIG. 13 illustrates a perspective view of an example sealing cover for use with the example biochar kiln of FIGS. 1-7.

FIG. 14 illustrates an exploded view of the sealing cover of FIG. 9.

FIG. 19 illustrates another partial cut-away side perspective view of the example flow regulation assembly of FIGS. 15-18.

FIG. 20 illustrates yet another partial cut-away side perspective view of the example flow regulation assembly of FIGS. 15-19 with support bracket 565 removed.

DETAILED DESCRIPTION

Figure 1:
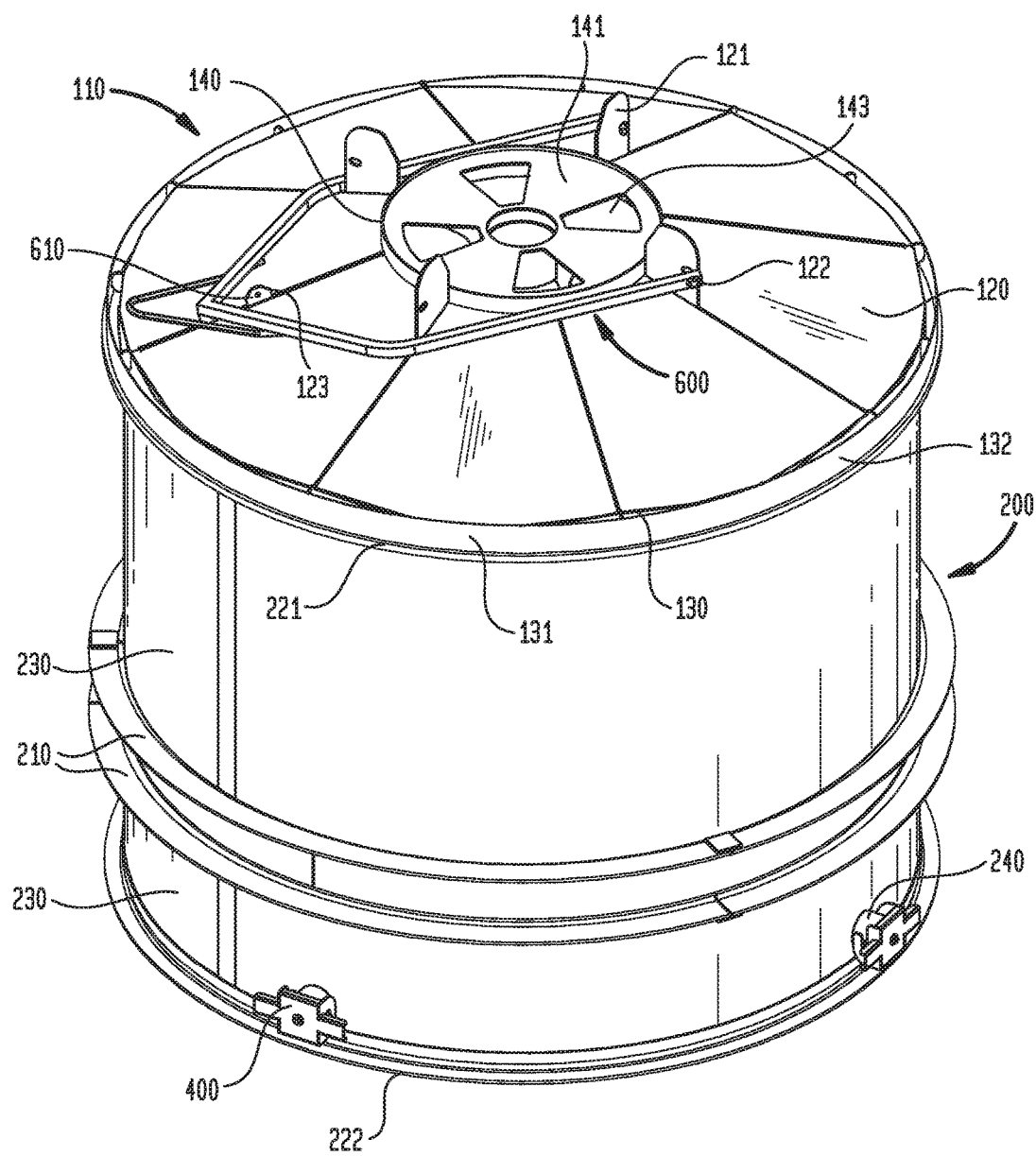
FIG. 1 illustrates a side perspective view of an example managed or controlled kiln usable by itself or as part of a biochar production plant.

When char is produced from biomass feedstock, the char is referred to as "biochar." The biochar described herein is a unique carbon product created in a low oxygen or oxygen-deprived, high-heat environment. Limited oxygen prevents combustion and instead of simply burning the biomass, converts the biomass to a structured biochar product exhibiting special physiosorptive and/or chemisorptive properties. The biochar product is a high-carbon, fine-grain product of pyrolysis (i.e., the direct thermal decomposition of biomass in a deprived oxygen environment to yield biochar products).

The relative quality and quantity of biochar product yielding from pyrolysis varies with process conditions (e.g., temperature). For example, pyrolysis controlled temperatures tend to produce a higher quality biochar, while erratic temperatures tend to yield unfinished product, more smoke, and/or more undesired liquid and gas emissions. Other process parameters also affect characteristics of the biochar product. For example, low temperatures may provide higher yields, but may also reduce the adsorption capacity of the biochar.

The biochar product may have very high adsorption capabilities (e.g., an affinity for vapor and aqueous phase molecules). The biochar may also possess cation and/or anion exchange capabilities that attract and sequester molecules, providing unique benefits. For example, markets for the biochar include, but are not limited to, agriculture uses, odor control, animal feed supplements, removal of mercury, heavy metals, toxins, organics, and/or other contaminants from industrial processes (e.g., coal power plant stack emissions or waste water such as that derived from oil and gas production and drilling), mitigation of oil spills, removal of excessive fertilizer from field run offs, sequestration of *e-coli*, phosphorus and other contaminants from drinking water, and containment of mine tailing contaminants, to name only a few examples.

The biochar product is also a stable solid which can endure in soil for many years. As such, the biochar product can be used to sequester fertilizer nutrients and water, which reduces leaching of nutrients from the soil and makes nutrients more readily available to plants. The biochar product can be used as a soil amendment or additive to improve crop yield, improve water moisture availability, reduce soil emissions of nutrients and greenhouse gases, reduce nutrient dispersion and leaching, improve soil pH, and reduce irrigation and fertilizer requirements. Biochar used in soil also helps reduce the use of externally applied fertilizers, thereby reducing cost and emissions from fertilizer production and transport. In addition, biochar enhances soils so that the same soil can be used potentially indefinitely to sustain agriculture. Biochar also provides soil microbial domiciles to protect the microbes from predators and weather (e.g., rains, drainage, and drought).

The biochar product can also be used to decrease fertilizer run-off by operation of the same sequestration mechanism. That is, the biochar can sequester contaminants in a highly stable form, thereby reducing soil contaminant uptake by plants. Biochar can also sequester nitrogen and methane in the soil, thereby reducing emissions from the soil.

The biochar product can be applied to fields using conventionally available machinery or equipment such as that used to apply fertilizer. The biochar can be mixed with manures, compost or fertilizers and included in the soil without additional equipment. Biochar has been shown to improve the structure and fertility of soils, thereby improving biomass production, which can in turn be used in the pyrolysis process to generate more biochar.

While the benefits of biochar may depend to some extent on external factors, such as environmental conditions (e.g., temperature and humidity) where the biochar product is being used, the specific benefits of the biochar produced according to the systems and methods described herein are at least somewhat dependent on the properties of the biochar itself. Accordingly, the systems and methods described herein may be used to specifically design biochar products to target various end-uses.

Before continuing, it is noted that as used herein, the terms "includes" and "including" mean, but is not limited to, "includes" or "including" and "includes at least" or "including at least." The terms "managed" and "controlled" are used interchangeably to describe the kiln. The term "based on" means "based on" and "based at least in part on."

FIGS. 1-8 illustrate various aspects of an example biochar kiln 100. It is noted that the biochar kiln is not limited to the one shown in the figures. Variations are also contemplated as being within the scope of the claims, as will be readily apparent to those having ordinary skill in the art after becoming familiar with the teachings herein.

In an example, the biochar kiln is a wood burning kiln. Feedstock may be burned in a combustion chamber within the kiln to provide self-sustaining energy such that no appreciable external heat is used. Trees and/or other biomass may be used as the feedstock.

In another example, biomass feedstock may be converted to char with external heating by, for example, gas, electricity, biomass heat sources or combinations thereof.

Figure 2:
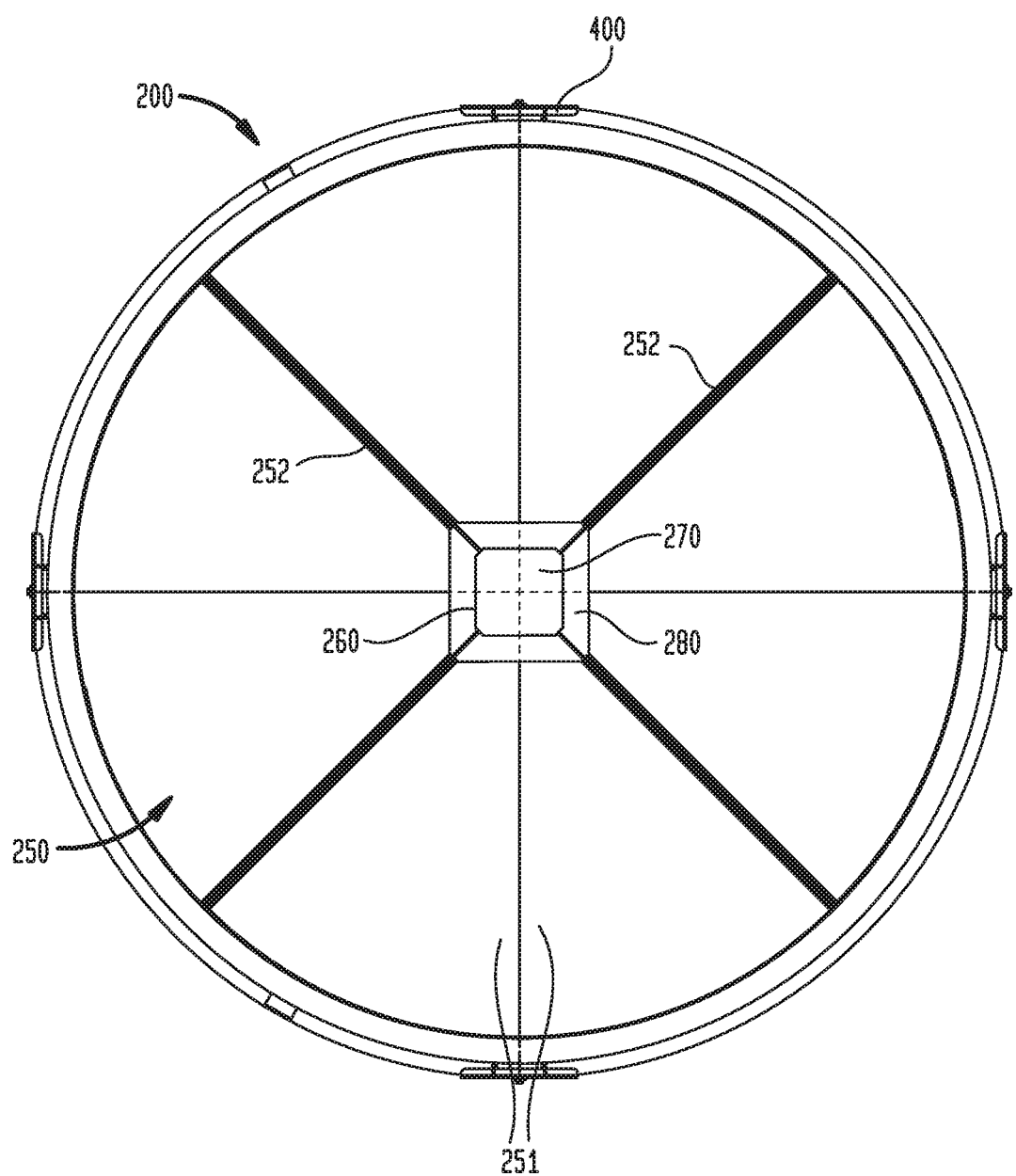
FIG. 2 illustrates a bottom view of the example controlled biochar kiln of FIG. 1.

With particular reference to FIGS. 1 & 2, a kiln 100 includes a lid 110 a drum 200 comprised of walls 230 and bottom 250. Lid 110 is formed to be fitted to a top edge of drum walls 230 to close the top end of drum walls 230 with lid 120 and form a combustion chamber between lid 110, walls 230, floor 250. As shown, lid 110 has a planar circular shape. However, lid 110 may take any of variety of shapes which allow a relatively close fit of lid 110 with drum walls 230. In some examples, lid 110 may be formed from a plurality of panel segments 120 (e.g., eight panels, joined at adjacent side edges).

Lid 110 includes a lid flange 130 around its circumferential edge formed to fit over a top edge of drum walls 230. A gasket or other suitable retainer ring 132 may be provided around and separated from lid flange 130 by spoke tabs 131 (e.g., a high temp gasket rope which is compressed between the lid edge and top flange of the drum). Guide plates 121 extend from a top surface of lid 110. Two or more stack guide plates may include through-holes for receipt of a pipe/bail bushing 122 for use with lid bail 600, described in detail below. Chain plates 123 may also be formed to extend from top surface of lid 110 and include chain plate holes 124 configured to receive bail chains used to facilitate lifting.

Figure 9:
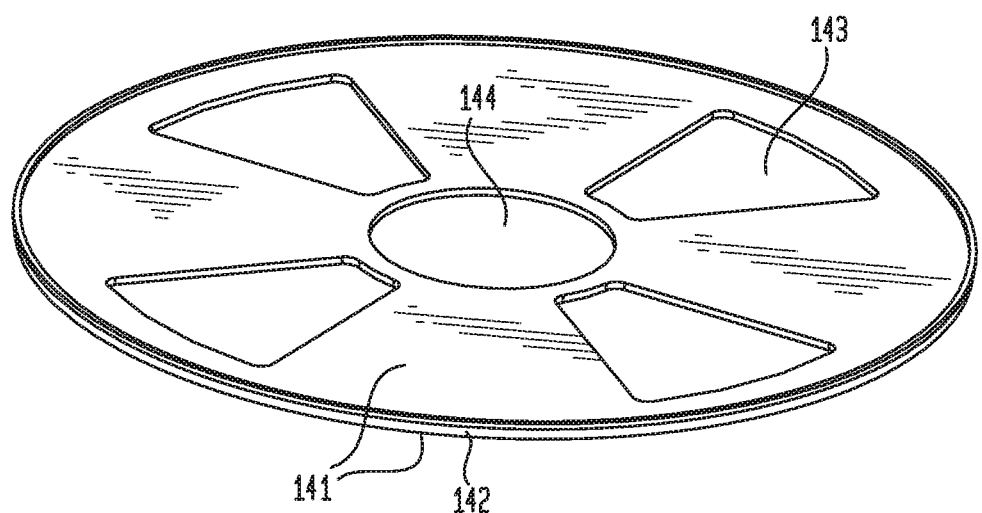
FIG. 9 illustrates a detail view of an example of a lid stack plate for use with the example biochar kiln of FIGS. 1-8 & 25-28.

A lid collar 140 is provided surrounding a central opening in lid 110. A lid stack valve plate 141, depicted in detail in FIG. 9, is fitted into the central opening and includes radial openings 143 and center opening 144. A lid seal ring 142 provided to a top surface of stack valve plate 141 is designed to enhance the seal of stack valve plate 141 with lid collar 140. In use, stack valve plate 141 regulates outlet of smoke from the combustion chamber through center opening 144. For example, lid stack valve plate 141 may be rotated between open positions in which openings 143 allow passage of exhaust and closed positions in which openings 143 are obstructed and prevent passage of exhaust. At an underside of lid 110, lid centering guides 145 extend radially inward from inner surface of lid collar 140 to meet with lid chimney sleeve 146 provided for fitting with chimney 300.

Figure 3:
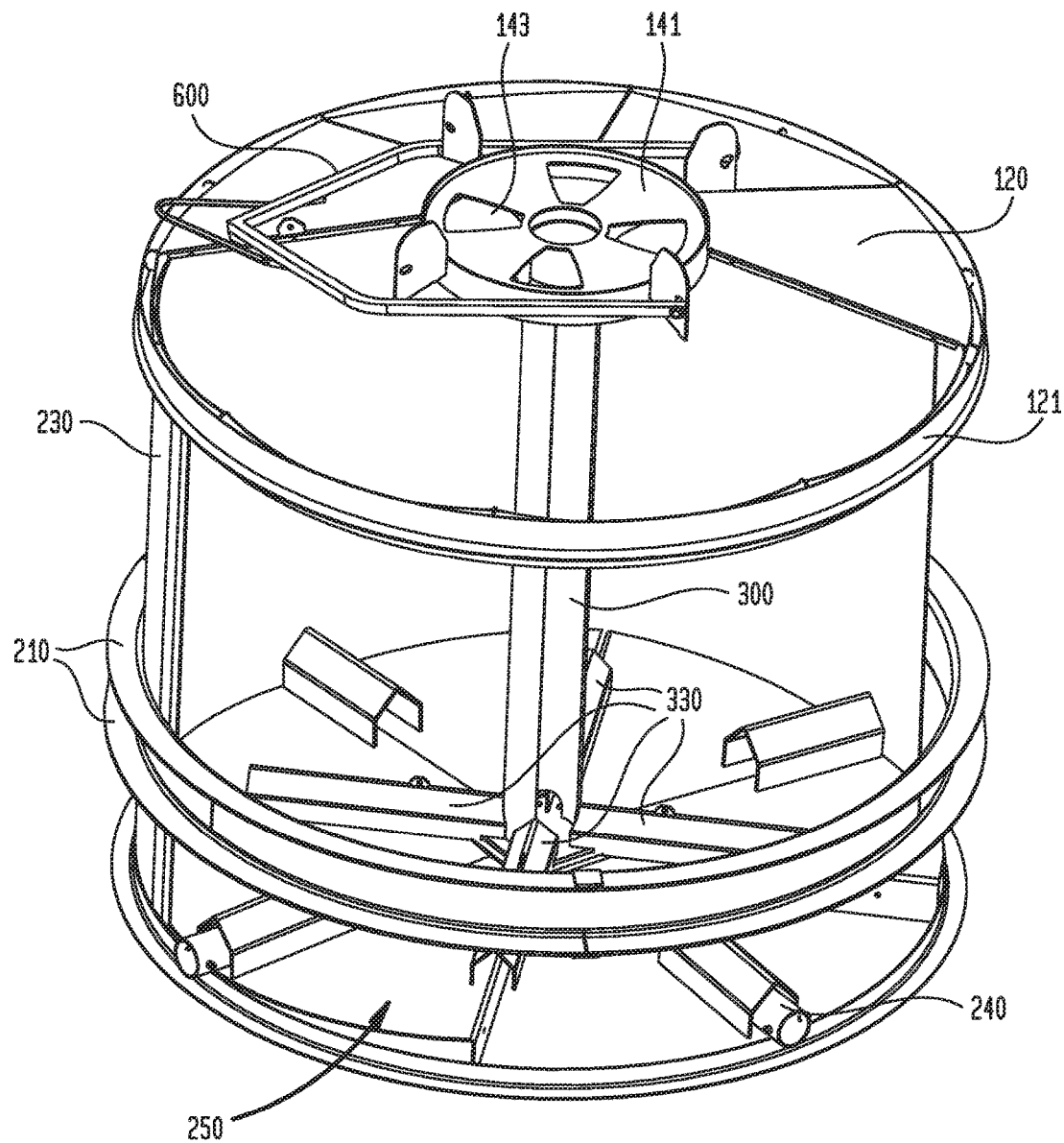
FIG. 3 illustrates a partial cut-away of a side perspective view of the example controlled biochar kiln of FIGS. 1 and 2.
Figure 4:
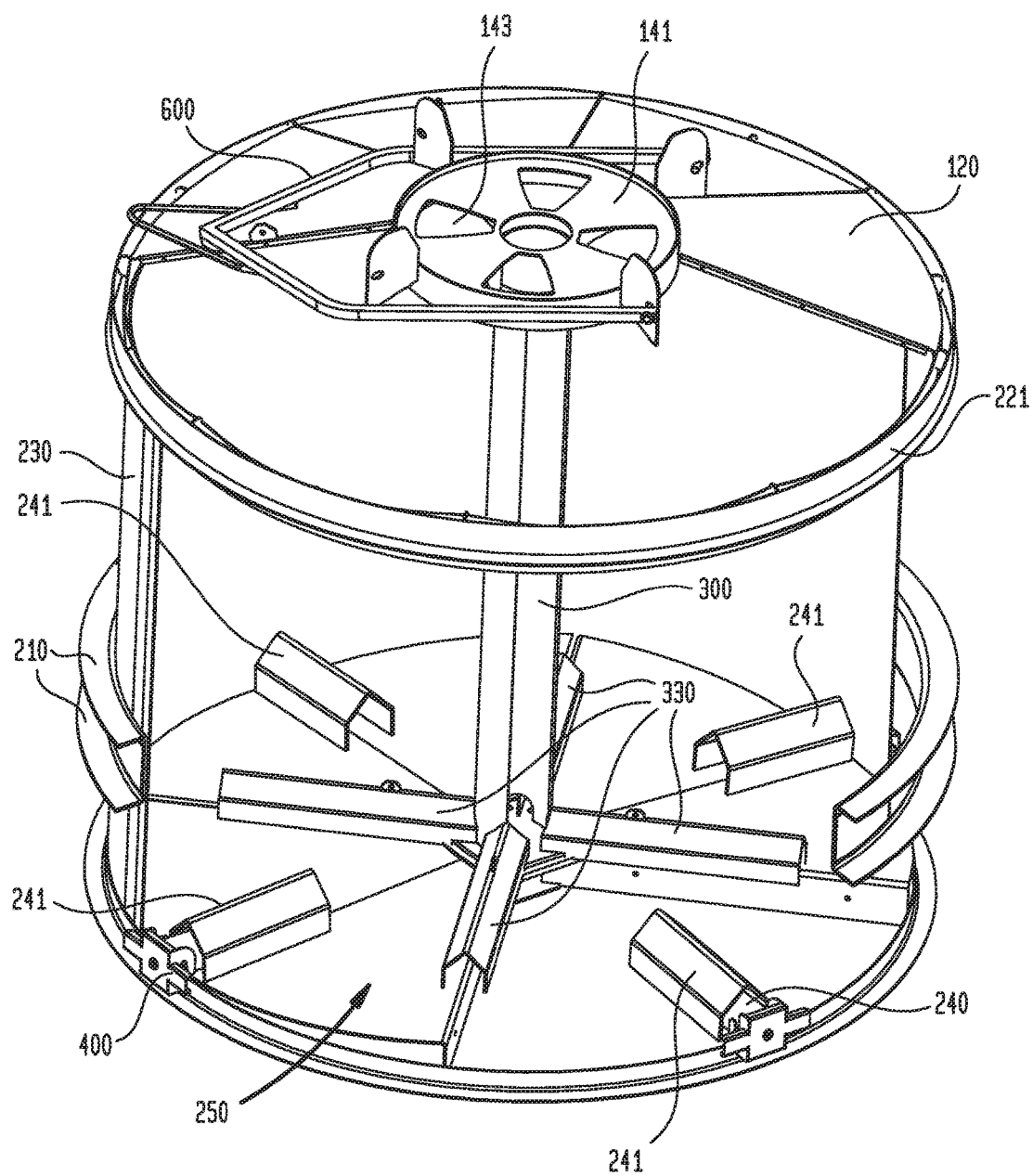
FIG. 4 illustrates a cut-away side perspective view of the example controlled biochar kiln of FIGS. 1-3 emphasizing an internal combustion chamber.
Figure 5:
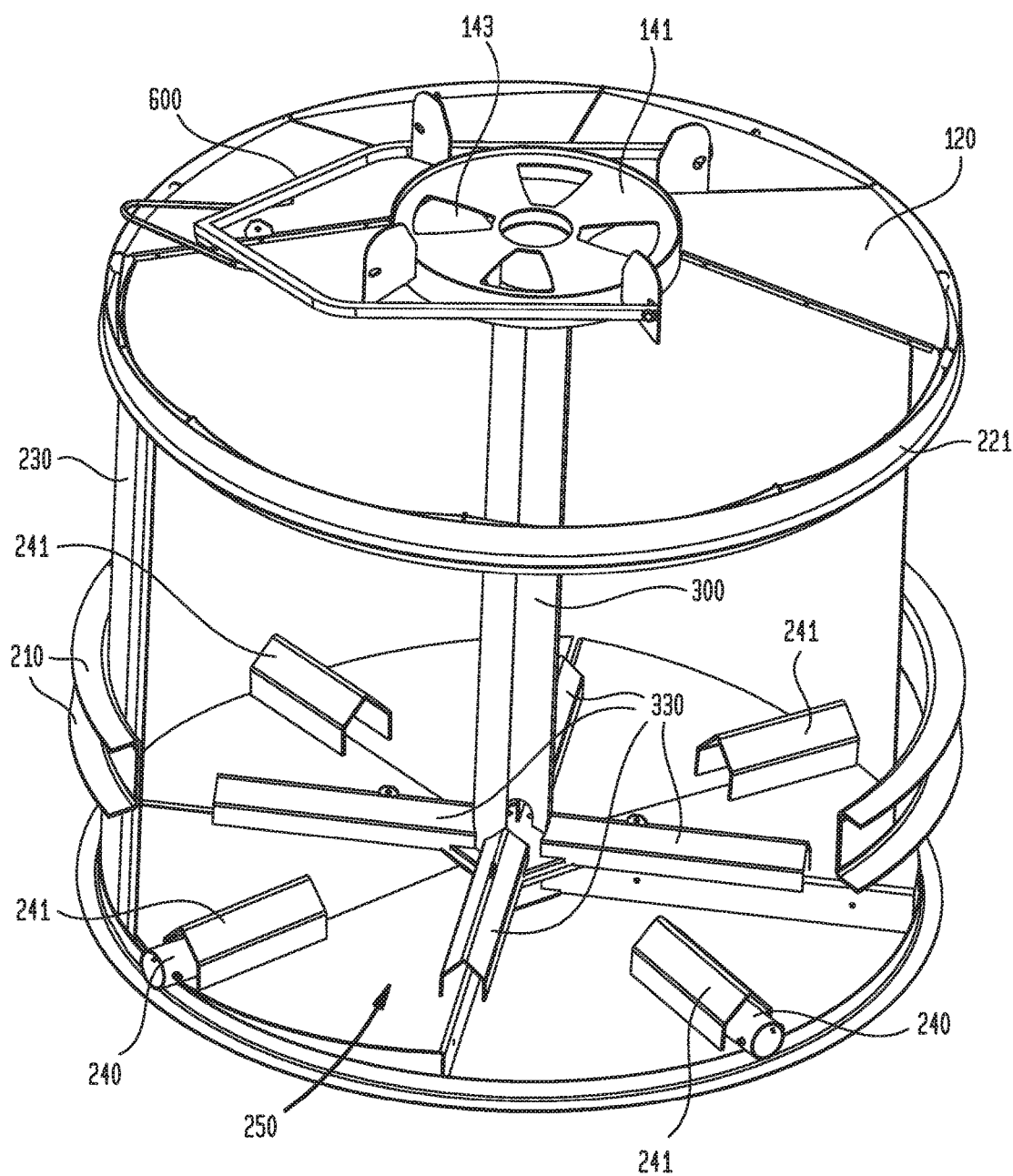
FIG. 5 illustrates a top view of the example controlled biochar kiln of FIGS. 1-4 emphasizing an internal combustion chamber.
Figure 6:
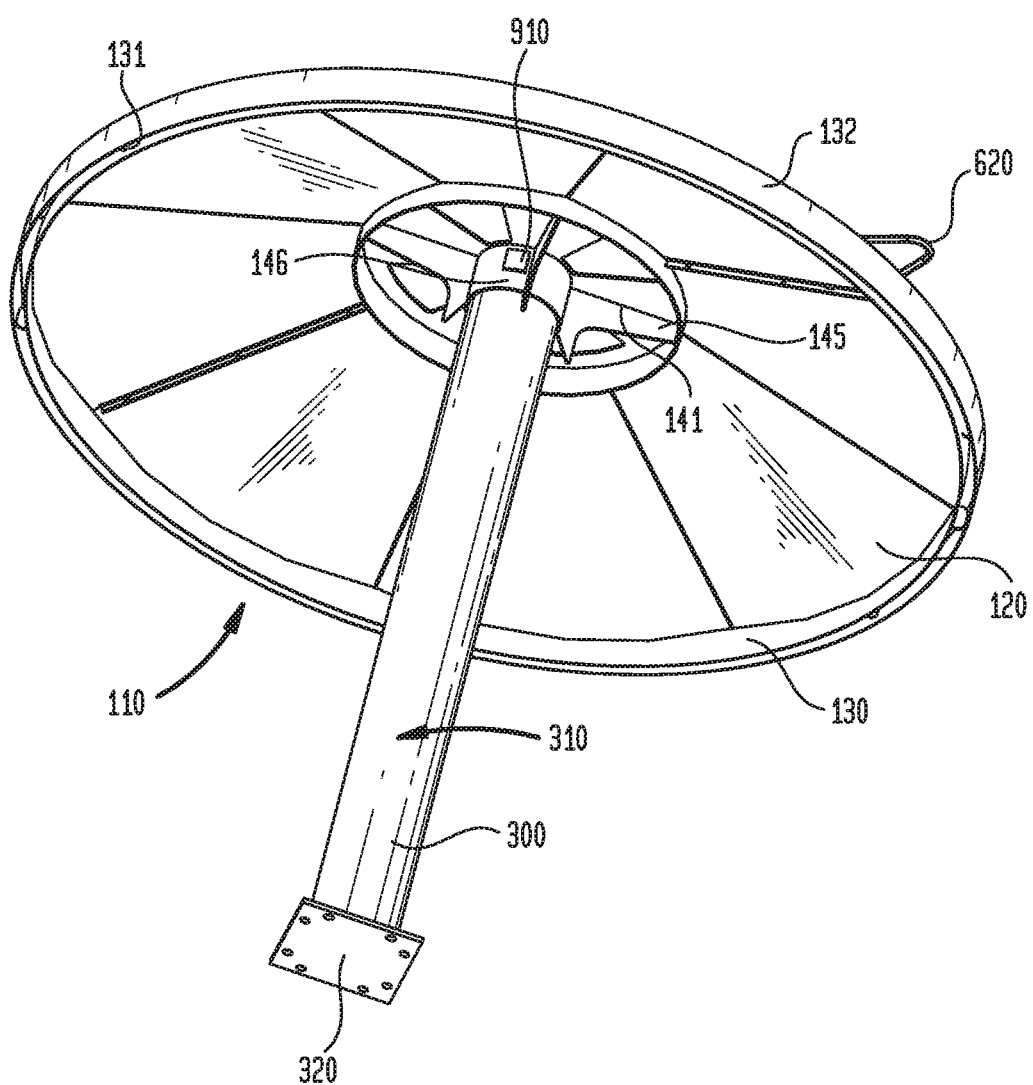
FIG. 6 illustrates a cut-away side perspective view of the example controlled biochar kiln of FIGS. 1-5 emphasizing a chimney component.

The lid 110 is designed to mate with an upper end of drum 200 to contribute to forming a combustion chamber as illustrated by way of example in FIGS. 3-5. Drum 200 includes walls 230 formed generally as a cylinder having top and bottom ends. In the example illustrated, walls 230 are a cylinder with a circular base. However, the base of walls 230 may take any of a variety of shapes which allow for a relatively close fit with lid 110 and floor 250. In an example, walls 230 may be constructed of a plurality of individual pieces. For example, two half-shells may be joined together during kiln assembly according to a process appropriate for the material of construction of the individual pieces. For example, if walls 230 are formed of metal, the pieces may be welded together. A channel grab ring 210 (FIGS. 1 & 3-5) is formed on an exterior surface of drum 200 to facilitate gripping of kiln 100 by an automated handler, as illustrated by way of example in FIG. 8. Channel grab ring 210 may include upper 221 and lower 222 support rings to guide grippers of an automated handler into a channel formed therebetween. Air inlet ports 240 are provided extending through walls 230 between exterior and interior sides to provide inlets for accepting regulated airflow into the combustion chamber.

Air inlet ports 240 allow outside air to enter the combustion chamber to feed the fire and may also be referred to as the primary air vents. As another function however, after initial firing of a kiln, another exothermic source, (e.g., propane "weed-burning" torches) may be inserted into each inlet port 240 to start a fire in each quadrant of the burn chamber. Air inlet ports 240 may be at least partially shielded from the heat of the combustion chamber by shields 241.

As depicted by way of example in FIG. 2, floor 250 is formed to be fitted to bottom edge of drum walls 230 to close the bottom end of drum walls 230 and form the previously mentioned combustion chamber between bottom 250, walls 230 and lid 110. As shown, floor 250 has a planar circular shape. However, floor 250 may take any of variety of shapes, which allow a relatively close fit of floor 250 with drum walls 230. In an example, floor 250 may be formed from a plurality of panel segments 251, for example eight panels, joined at adjacent side edges. Floor ribs 252 are shown extending radially inward from the outer circumference of floor 250 to an air inlet pipe 270 extending through a center opening in floor 250.

Ribs 252 provide added structural integrity to floor 250. A bottom tie plate 260 is provided spaced apart from floor 250 by ribs 252. A stack mount plate 280 is also provided. In an example, bottom tie plate 260 may be used to join the floor stiffeners. The bottom tie plate 260 may also be removed, for example, to add a center mounted blower air pipe or to reduce manufacturing costs.

An example is shown in FIGS. 3-5 wherein the floor may be sloped to facilitate draining of liquid buildup from burning wet wood, and or include "wood vinegar" (derived from the wood, volatiles, and liquid creosote). Low points on floor 250 may be substantially lined up with inlet air ports 240 to permit drainage of liquid from inside the kiln out through the air inlet ports 240.

A chimney 300 is depicted by way of example in FIGS. 3-6. Chimney 300 may extend within the combustion chamber between the center opening of floor 250 and the center opening of lid 110 and out therethrough. Chimney 300 is configured for heating during pyrolysis and for exhausting smoke from the combustion chamber. As illustrated, chimney 300 has a generally cylindrical shape and in use, a top portion of chimney 300 may be mated to lid chimney sleeve 146 while a bottom end is partially encompasses air inlet pipe 270 and is mated to chimney bottom plate 320.

Figure 25:
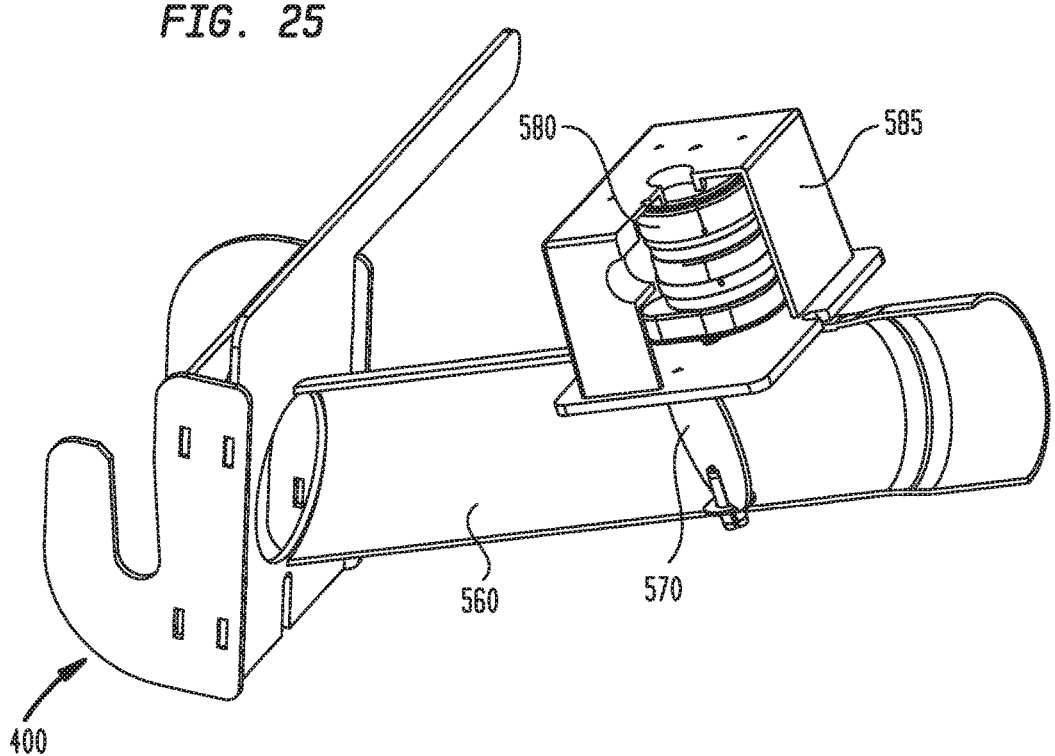
FIG. 25 illustrates a partial cut-away side perspective view of the example flow regulation assembly of FIGS. 23 & 24.
Figure 26:
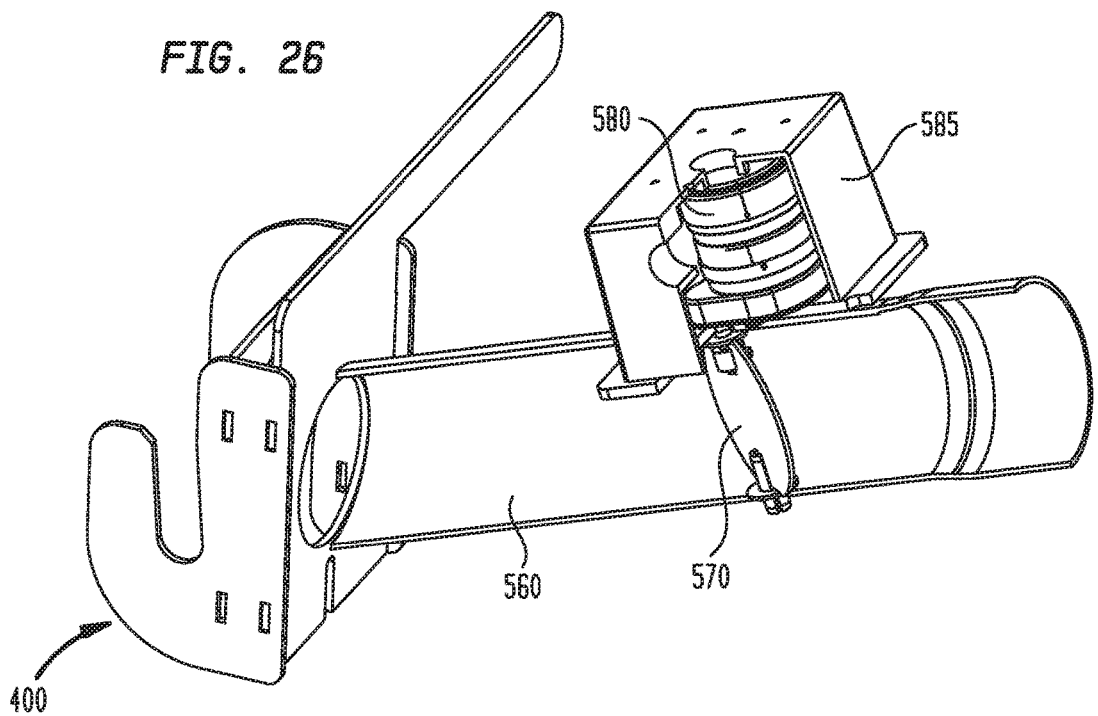
FIG. 26 illustrates another partial cut-away side perspective view of the example air inlet port flow regulation assembly of FIGS. 23-25.
Figure 27:
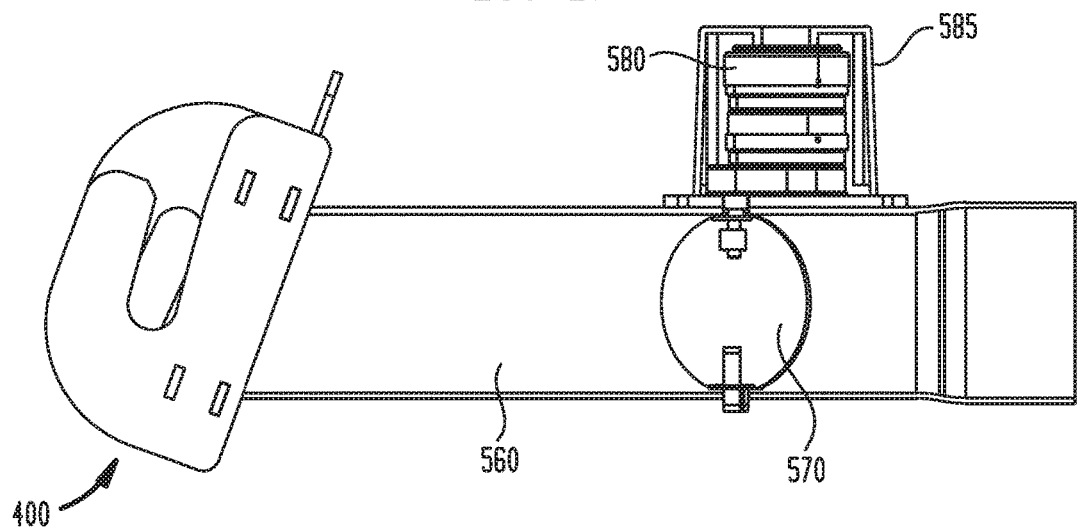
FIG. 27 illustrates a partial section view of the example air inlet port flow regulation assembly of FIGS. 23-26.
Figure 28:
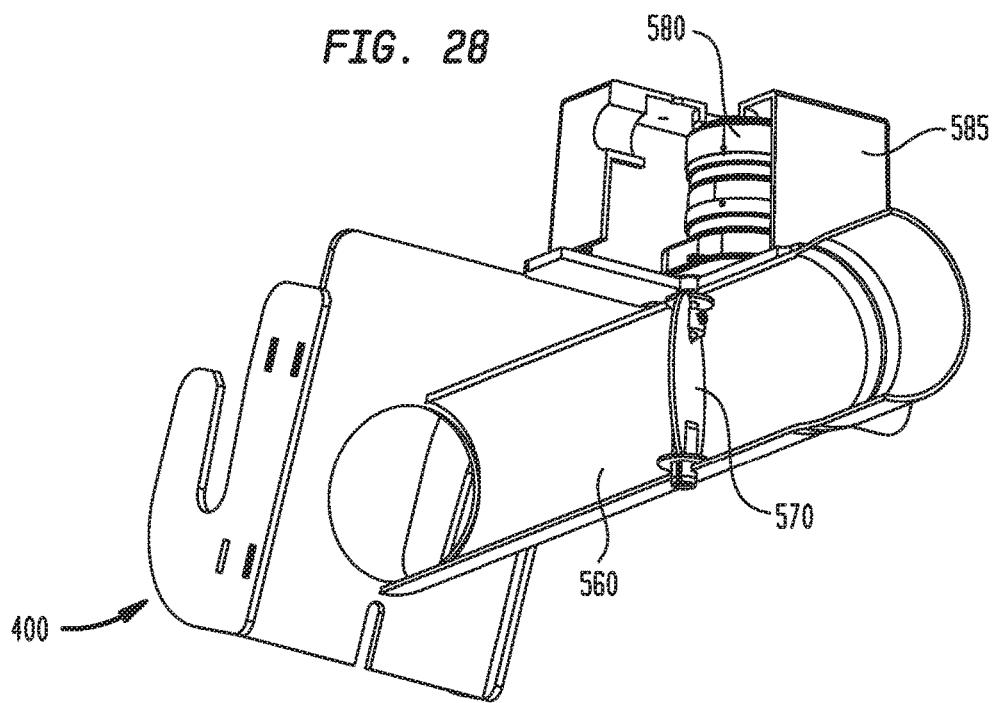
FIG. 28 illustrates another partial cut-away perspective view of the example air inlet port flow regulation assembly of FIGS. 23-27.
Figure 29:
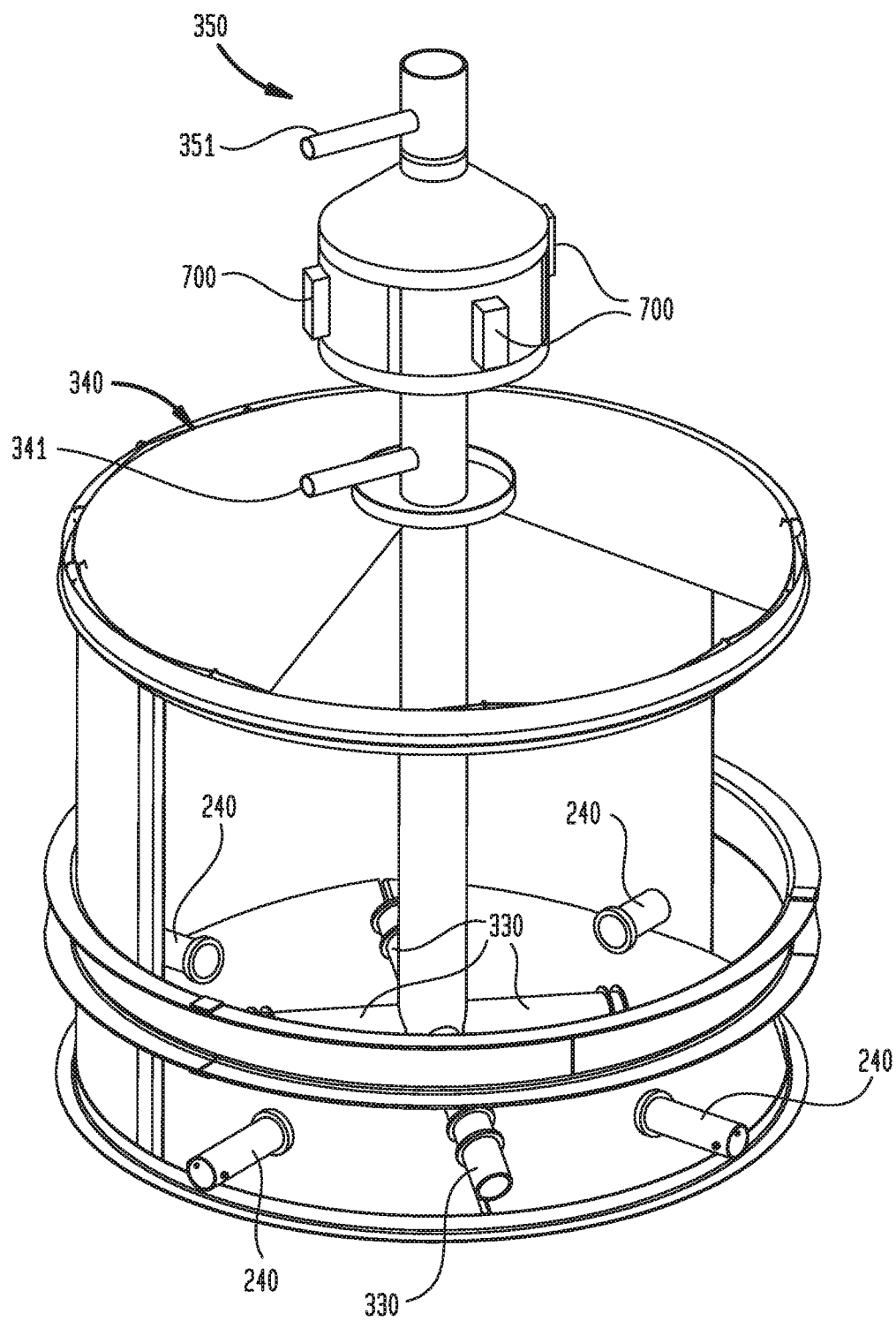
FIG. 29 illustrates a cut-away side perspective view of a biochar kiln with an first example exhausting system.
Figure 30:
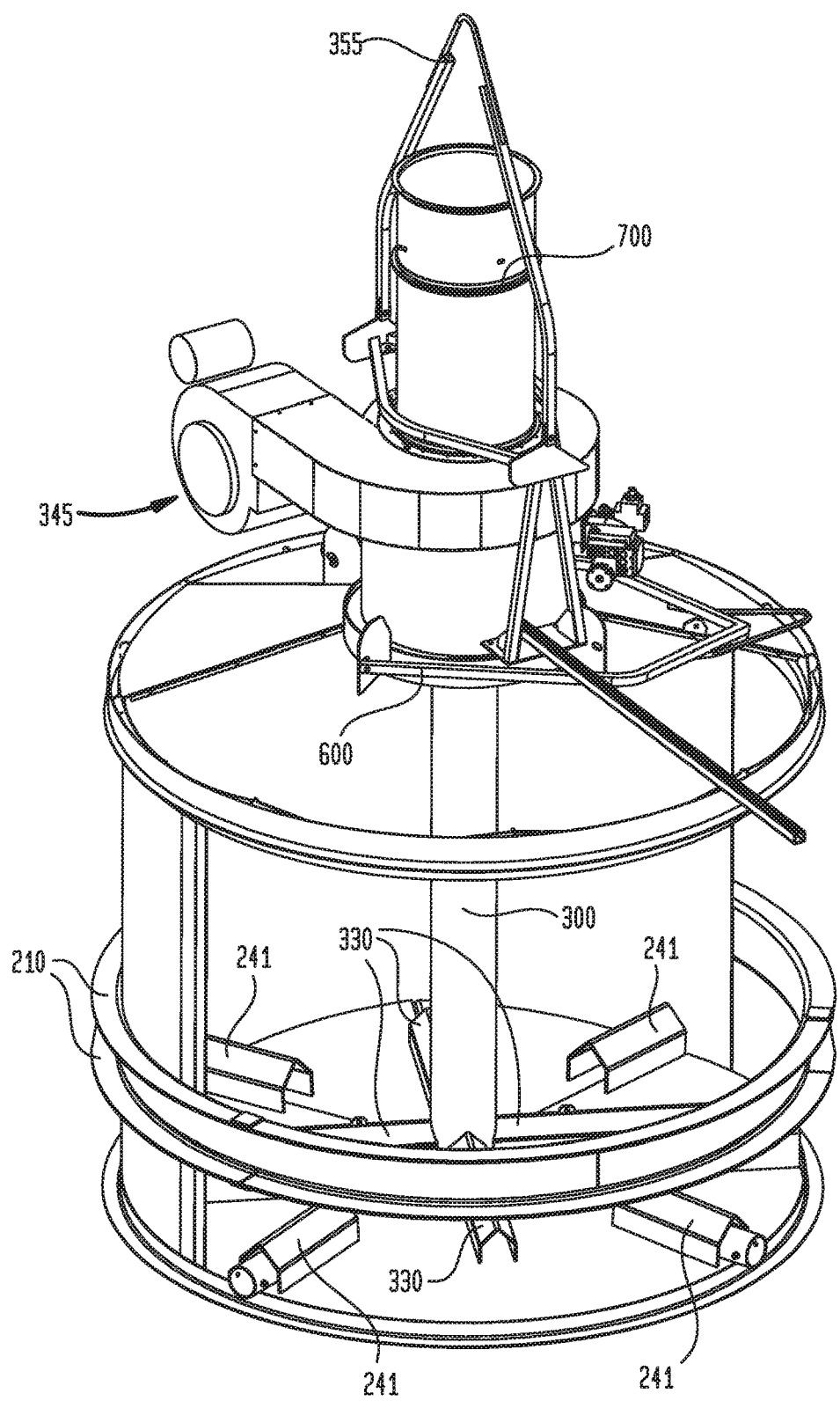
FIG. 30 illustrates a cut-away side perspective view of a biochar kiln with a second example exhausting system.
Figure 31:
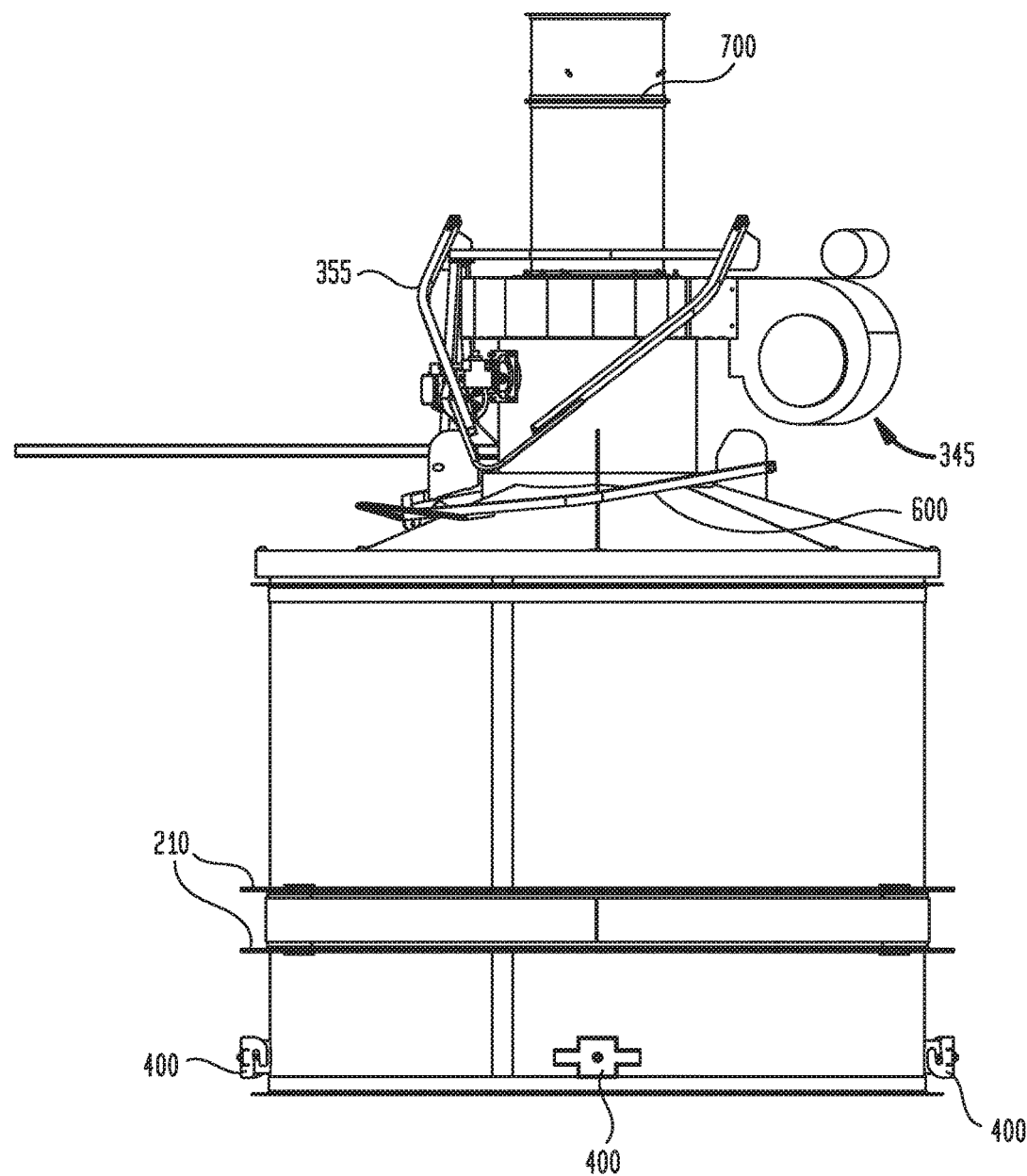
FIG. 31 illustrates a side view of the biochar kiln of FIG. 26.
Figure 32:
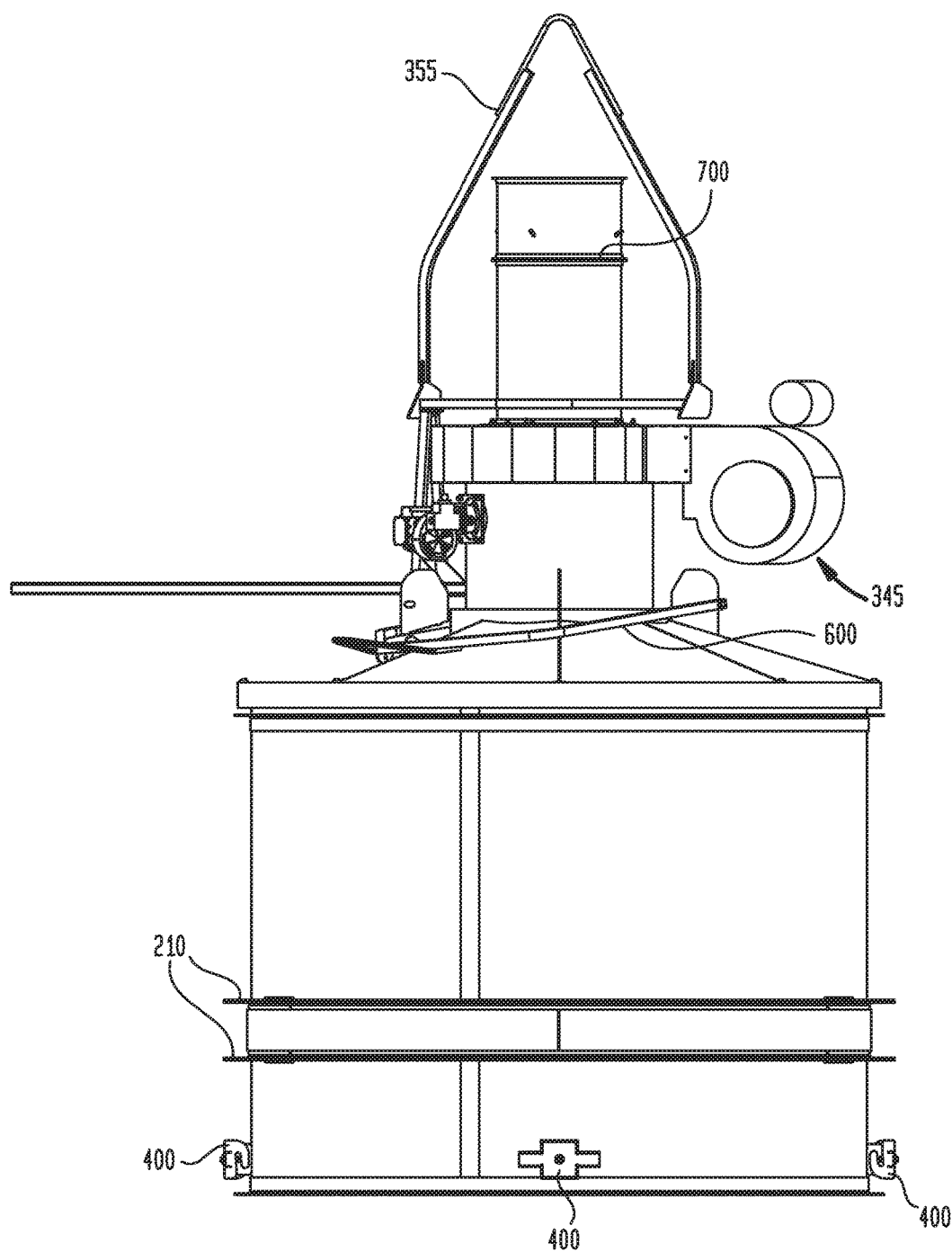
FIG. 32 illustrates another side view of the biochar kiln of FIGS. 26 & 27.

In an example, chimney 300 includes exhaust inlet pipes 330 (also referred to as scavenger pipes) configured to pass smoke and air from the combustion chamber to chimney 300. Centrally locating chimney 300 with a plurality exhaust inlet pipes 330 serves to balance air intake from the plurality of air inlet ports 240. For example, when wind is blowing strong on one side of the kiln but not as strong on another, chimney 300 mixes air intake from across all of the inlets 330. Smoke is exhausted from the combustion chamber into chimney 300 up through upper sub-stack 350 (FIG. 25).

Kiln 100 may be manufactured of steel, other materials or combinations thereof and may be designed to be disassembled, relocated, and then reassembled or may be provided as a unitary structure. Kiln 100 may be constructed to a variety of dimensions but may be, for example, approximately 1 m in height.

Figure 7:
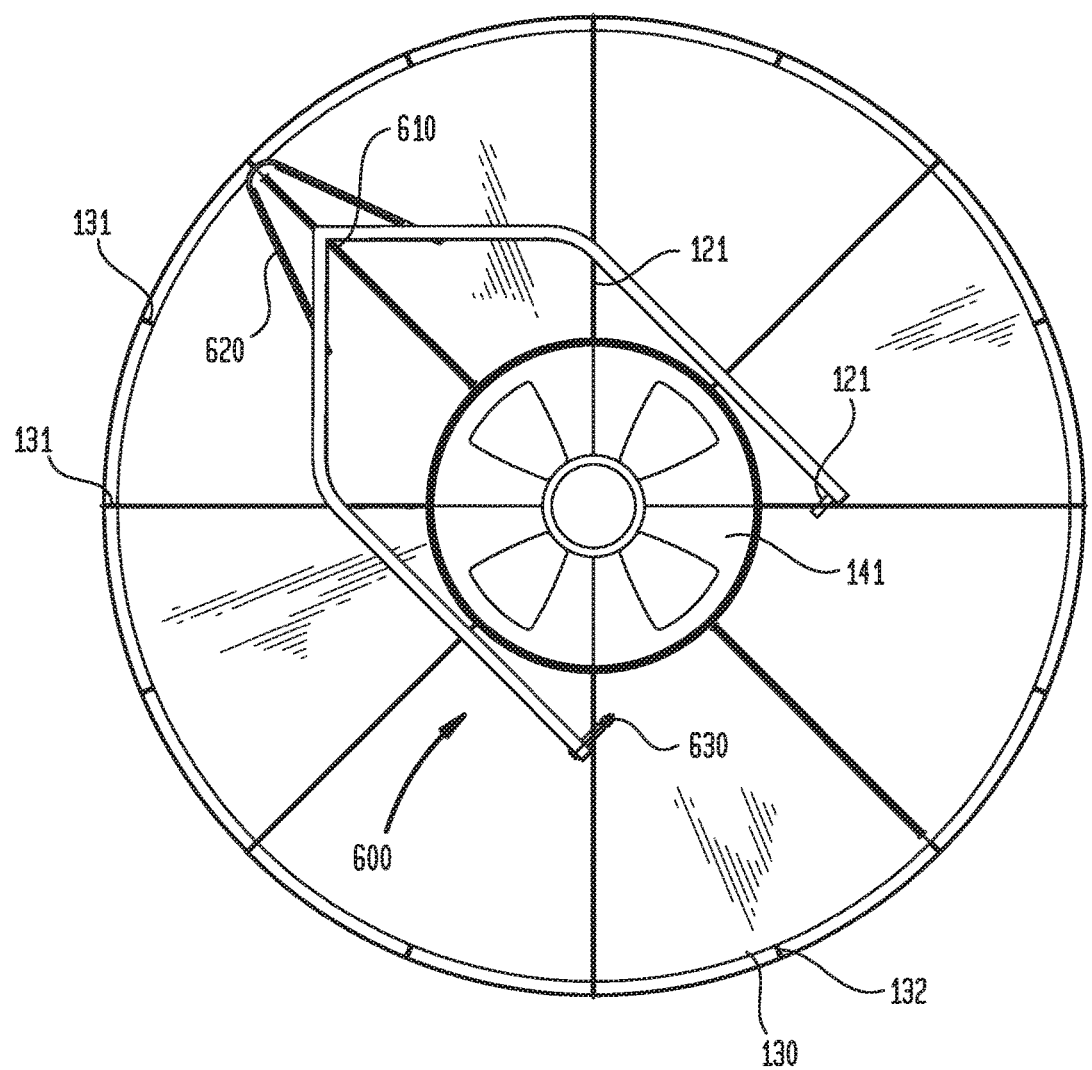
FIG. 7 illustrates a top view of the example controlled biochar kiln of FIGS. 1-5.
Figure 8:
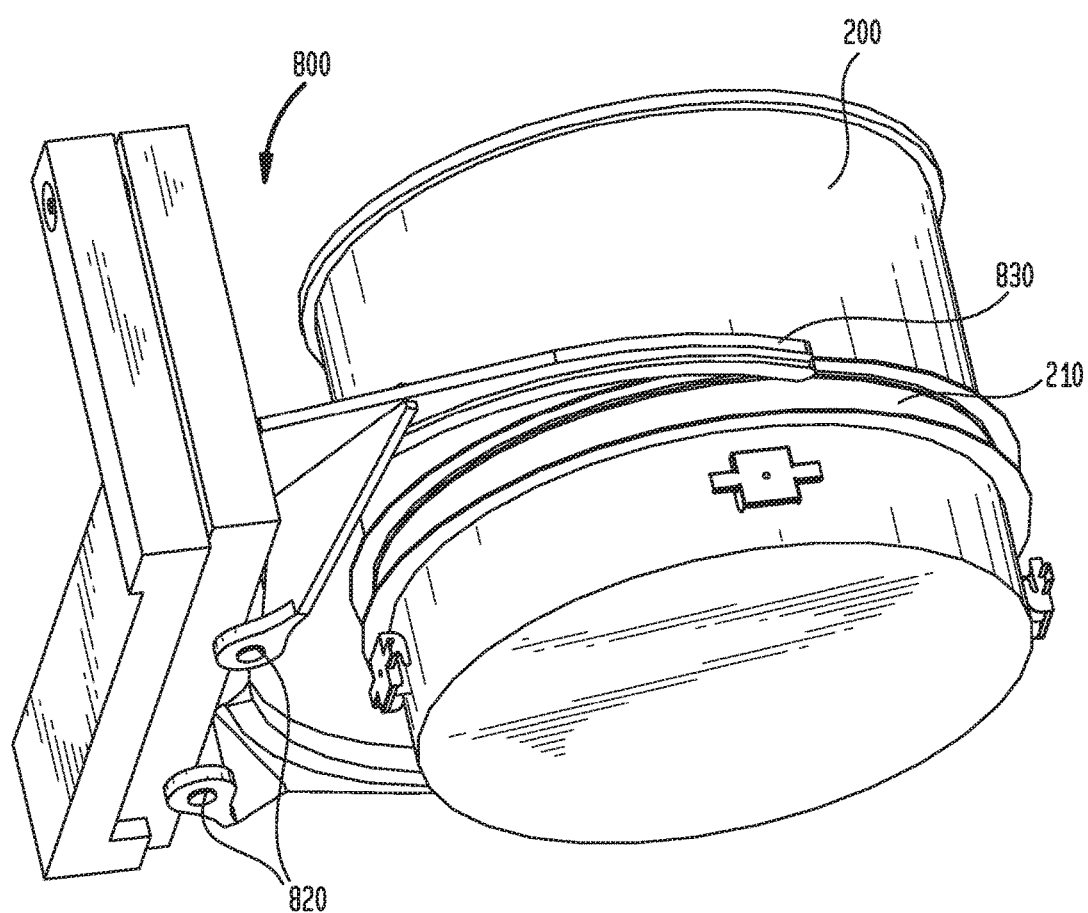
FIG. 8 illustrates an example automated handler engaging a biochar kiln during transport of the kiln from one station of a production plant to another.

As depicted by way of example in FIG. 7, lid bail 600 may be hingedly engaged with stack guide plates 121 by bushings 122 and bail pivot bolt assembly 630 which may include a hex bolt, a nut and a washer. Bail chain plate 610 provides an opening for receipt of a bail chain for securing bail bar 620 to prevent pivoting of lid bail 600. Lid bail 600 is provided to facilitate lifting of kiln lid 110 to remove lid 110 from drum 200 to open kiln 100.

Based at least in part on the feedstock characteristics, pyrolysis may release carbon dioxide, black carbon, carbon monoxide, and other greenhouse gases into the air in the form of smoke, contaminants, and odors. Therefore, for biochar production to work on a commercially viable scale, the kiln described herein may implement effective capture and mitigation techniques for the exhaust gases. As an alternative, or in addition thereto, a catalytic converter may be provided to reduce or altogether eliminate smoke and/or odor emissions into the surrounding environment and/or atmosphere.

Figure 10:
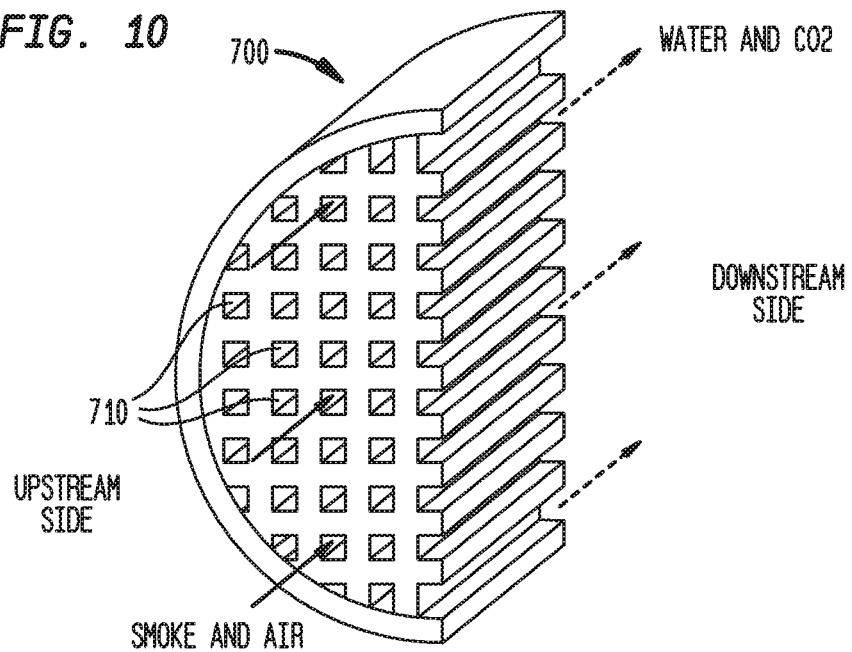
FIG. 10 illustrates a perspective section view of an example catalytic converter for use with the example biochar kilns of FIGS. 1-8 & 25-28.

FIG. 10 illustrates a perspective section view of an example catalytic converter 700 for use with biochar kiln 100. A catalytic converter 700 (also referred to as a combustor or a secondary combustor) may be configured to fit within chimney 300 near center opening 140 of lid 110 of biochar kiln 100, such that exiting smoke passes through catalytic converter 700. In an example, more than one catalytic converter may be provided as shown by way of example in FIG. 25.

As smoke from the combustion chamber passes through a catalytic converter, the smoke particulate is incinerated at a high temperature (e.g., 926° C. or higher, and at least higher than the pyrolysis temperature), thus enabling the smoke itself to be incinerated prior to being emitted from the biochar kiln. As such, use of a catalytic converter may help comply with government environmental standards. For example, using a catalytic converter may allow an installation to operate a large number of kilns (e.g., 200 kilns or more at one site) at substantially the same time.

In an example, the catalytic converter 700 includes channels 710 as part of its internal chamber structure through which air (e.g., including oxygen) and smoke (e.g., including hydrocarbons and other carbon byproducts such as CO, $NO_2/NO_3$ and others) pass after entering catalytic converter 700 from the combustion chamber. In an example, the exhaust includes water vapor and $CO_2$ exiting on a downstream side of channels 710.

Catalytic converter 700 may be made of any suitable material, such as chemically treated metals (e.g., depositions of Platinum and Palladium), ceramic, or combinations thereof. In an example, catalytic converter 700 is formed as a disk measuring from approximately 15 to approximately 30 centimeters (cm) in diameter, and from approximately 2.5 to approximately 8 cm in thickness. However, catalytic converter 700 may be formed to have any of a variety of dimensions enabling it to fit well within any outlet of the kiln 100.

Catalytic converter 700 is configured for operating conditions of the biochar kiln with which it is used and is not limited to the structure shown but, instead, may adopt any of a variety of structures appropriate for incinerating smoke produced in the combustion chamber. Catalytic converter may take a variety of shapes.

Catalytic converters may operate optimally at controlled temperatures. Temperatures may be controlled using preheating, or by waiting until the combustion chamber is sufficiently heated on its own. When smoke is not sufficiently hot, supplemental heating may be used to preheat catalytic converter 700. For example, the catalytic converter 700 may be preheated to a desired temperature in a range of from approximately 176° C. to approximately 871° C. before lighting kiln 100, for example, by inserting a propane torch into an opening near the bottom of the catalytic converter.

In another example, catalytic converter 700 may be preheated using a (e.g., gas) furnace burner supplied within the combustion chamber near catalytic converter 700. This burner may be cycled on and off by a computer.

For purposes of illustration, during operation, in light mode, a burner as described above is used to preheat catalytic converter 700 core temperature to approximately 315° C. The pre-heat burner may be kept on until catalytic converter 700 reaches a temperature of greater than approximately 537° C.

The catalytic converter 700 may be maintained at the desired operating temperature throughout the burn and cook modes to facilitate incineration of smoke and emissions. If the temperature of the catalytic converter 700 drops, the burner may be turned back on to keep catalytic converter 700 smoke free. Quadrants of the combustion chamber may be driven to equal temperatures using individual controls.

If heat generated in the combustion chamber of the biochar kiln and the smoke is sufficiently hot, catalytic converter 700 may be operated without any preheating.

Ending the pyrolysis at the appropriate time can be important to obtain desired characteristics of the biochar product. Left to continue burning longer, yield may be burned off. If the burning is shorter, undercooked biochar may have lower adsorptive performance. Accordingly, a monitor and control subsystem may be implemented to help ensure optimal biochar product yield (e.g., product characteristics and/or product volume).

In an example, the monitoring subsystem may include a weight or mass sensor. For example, the sensor may monitor mass of the biochar kiln. The monitored mass may be a gross weight, or a tarred mass (e.g., mass of the product loaded into the kiln minus mass of kiln itself). Generally, the mass of the feedstock will decrease as the feedstock is converted to biochar product. Accordingly, the sensor may be used to detect a predetermined mass indicating an optimal yield (e.g., that the feedstock has completely converted to biochar product).

The catalytic converter(s) operate with a mixture of air and smoke particles to operate efficiently. Too little oxygen and/or smoke, or too much can result in improper operation. In an example, about 8% oxygen is provided into the catalytic converters during operation, and output is measured for about 2-3%. The difference indicates proper oxygen levels are being consumed by the catalytic converter, and the catalytic converter is not being starved for air. If there was 0% oxygen in the effluent, then it would be difficult if not impossible to determine whether the catalytic converters were consuming the proper amount. Thus, providing sufficient oxygen into the catalytic converters gives a good indication that enough air is being consumed with very little surplus (which could result in belching smoke).

The temperature of a catalytic converter may drop when denied fuel (in the form of smoke) or oxygen. When feedstock is cooking out excessive organic matter and moisture, there may be plenty of smoke to fuel the catalytic converter. However, when the cooking stage begins to end (only biochar remaining), the amount of smoke is greatly reduced. As a result, the temperature of the catalytic converter may decrease due to a reduced fuel supply.

Considering the temperature changes, catalytic converter 700 may also be implemented as part of a monitor and control subsystem to determine when biochar production is complete. Air temperature above catalytic converter 700 may be monitored to detect a transition from a slow pyrolysis phase to a shut-down phase. The monitoring subsystem may be at any suitable location or distributed at various locations.

A temperature drop can be used as an indicator that the biochar conversion process is nearly complete. Accordingly, the temperature drop can be detected, and a notification can be issued to alert an operator that biochar conversion at or near completion.

Figure 11:
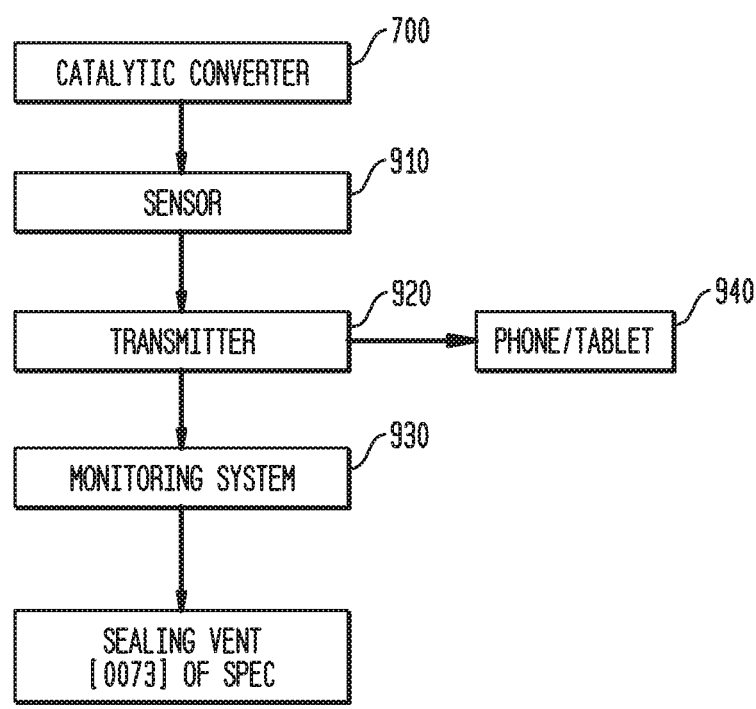
FIG. 11 illustrates a high-level schematic diagram of an example monitor and control subsystem.
Figure 15:
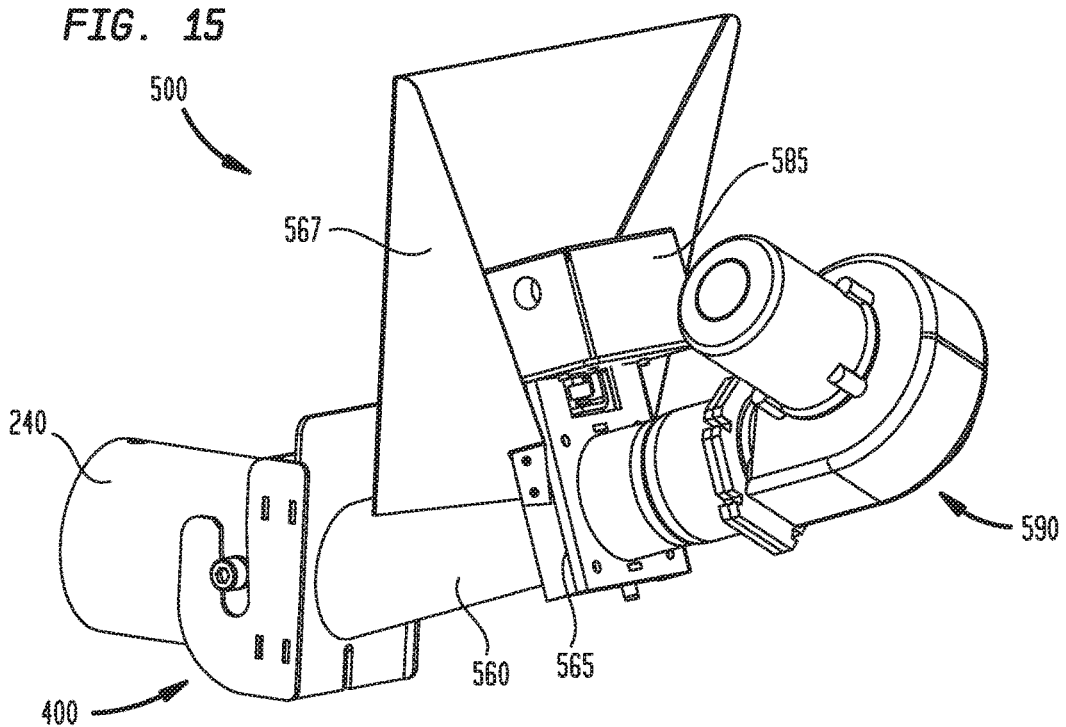
FIG. 15 illustrates a side perspective view of a first example of air inlet port flow regulation assembly coupled with an air inlet port 240.
Figure 16:
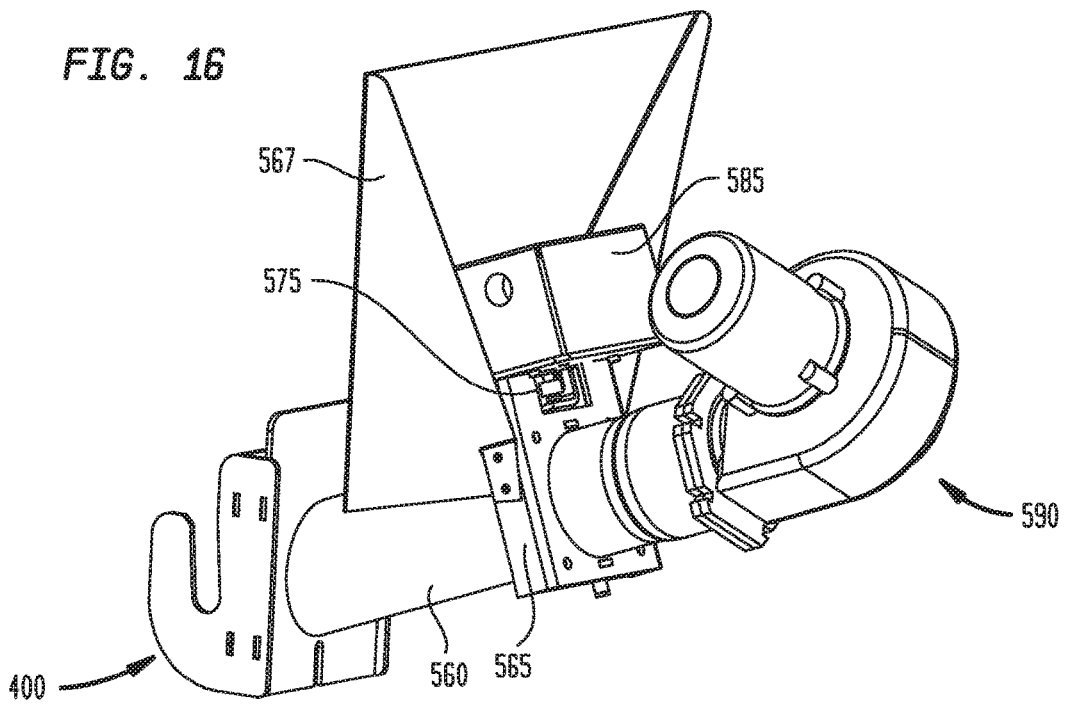
FIG. 16 illustrates a side perspective view of the example flow regulation assembly of FIG. 15 decoupled from air inlet port 240.
Figure 17:
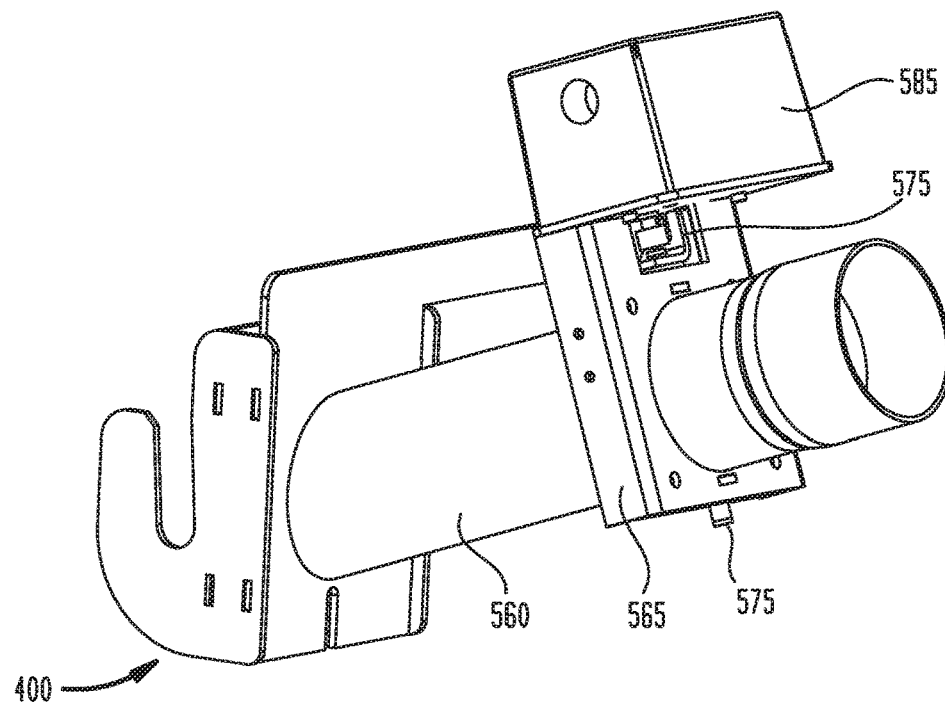
FIG. 17 illustrates a side perspective view of the example flow regulation assembly of FIGS. 15 & 16 without blower 590 and heat shield 567.
Figure 18:
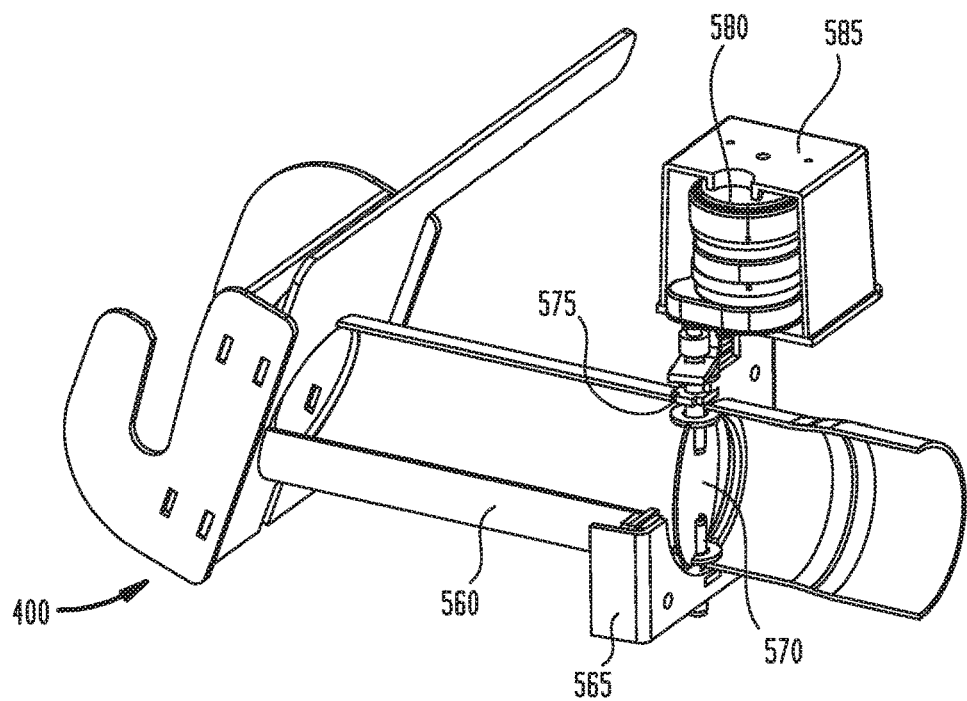
FIG. 18 illustrates a partial cut-away side perspective view of the example flow regulation assembly of FIGS. 15-17.
Figure 21:
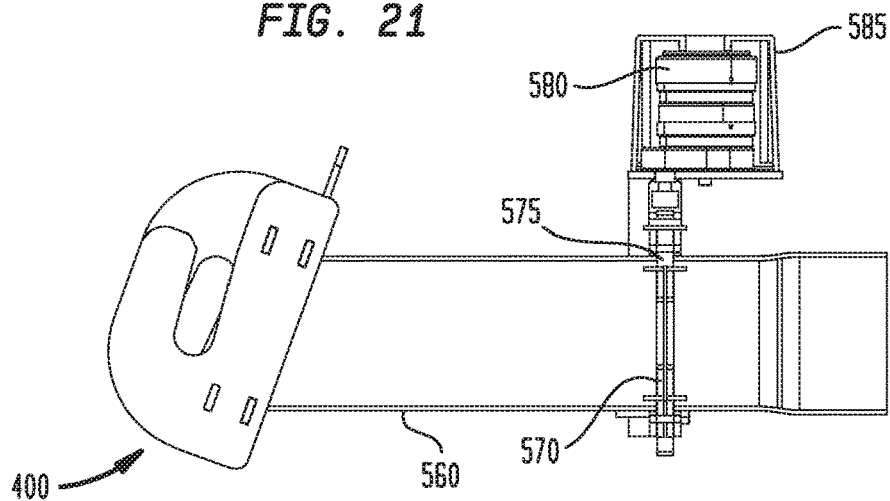
FIG. 21 illustrates a partial section view of the first example flow regulation assembly of FIGS. 15-20.
Figure 22:
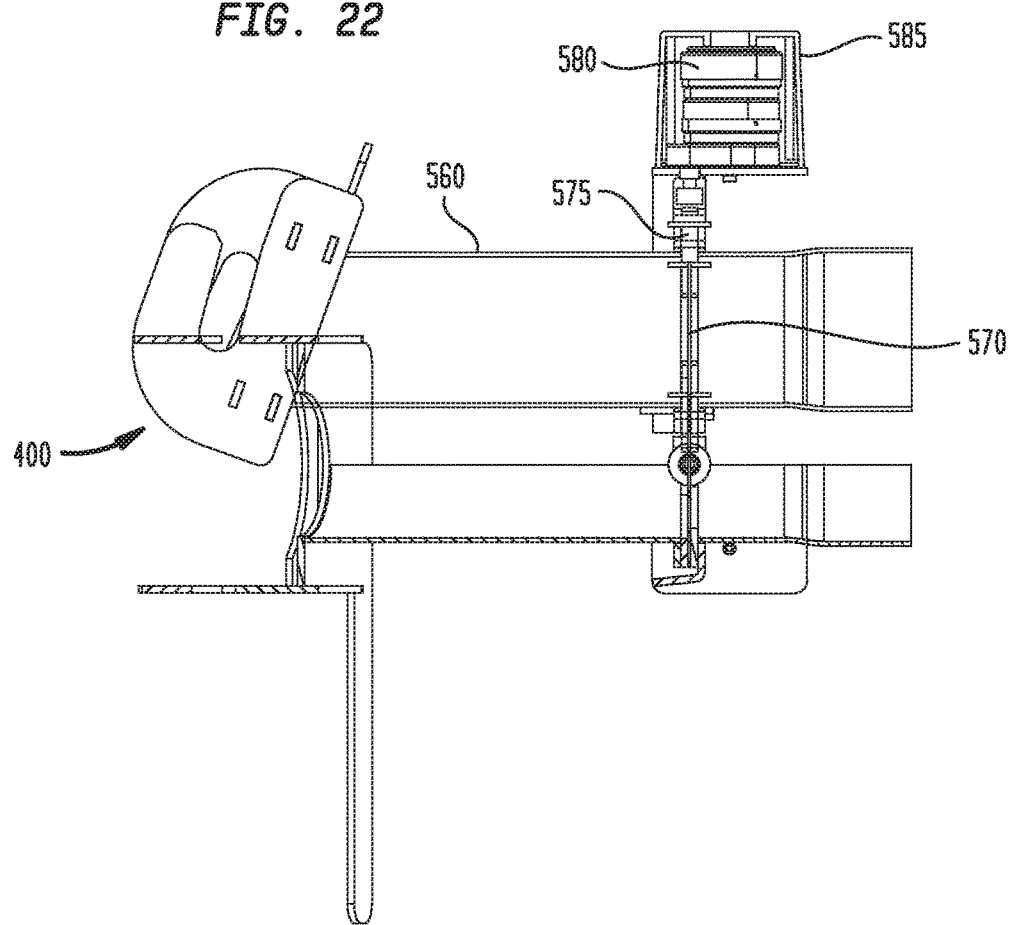
FIG. 22 illustrates a partial section view of a second example air inlet port flow regulation assembly.
Figure 23:
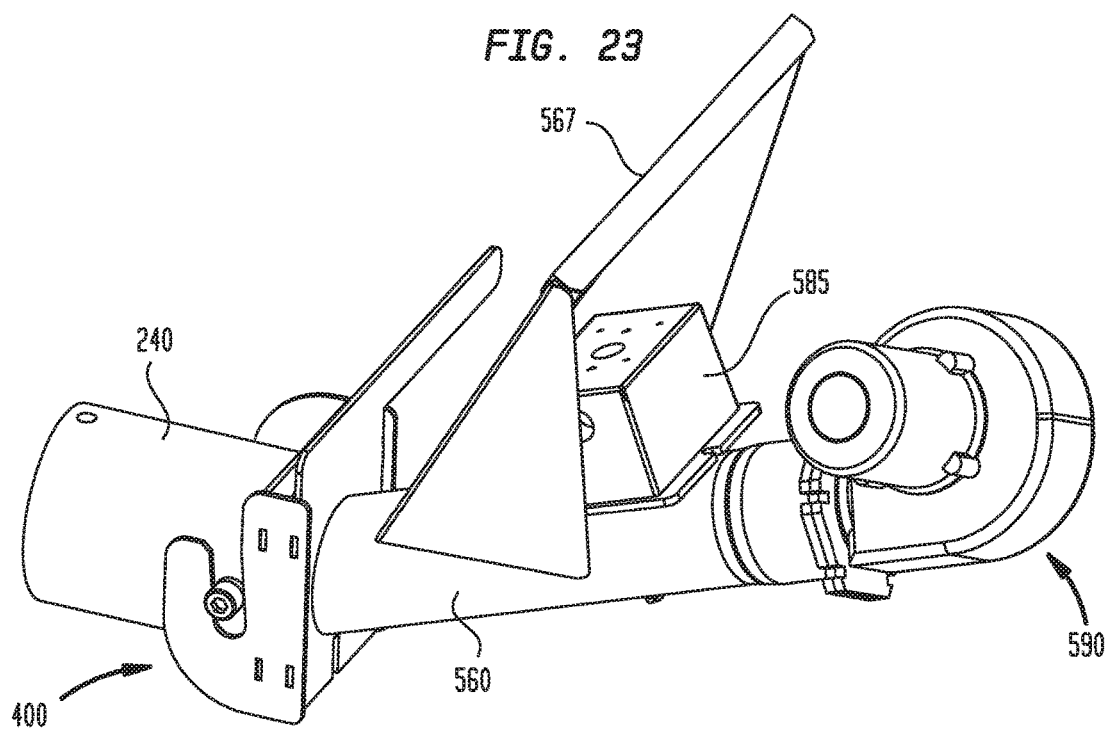
FIG. 23 illustrates a side perspective view of a third example air inlet port flow regulation assembly coupled with air inlet port 240.
Figure 24:
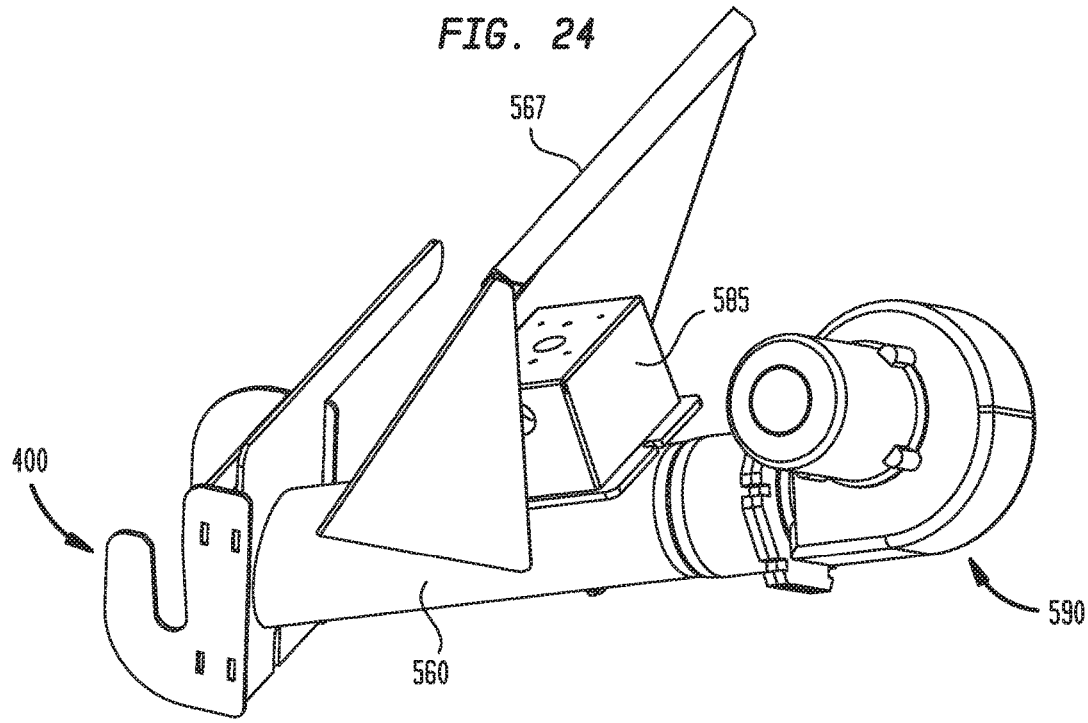
FIG. 24 illustrates a side perspective view of the example flow regulation assembly of FIG. 23 decoupled from air inlet port 240.

A monitor and control subsystem may include sensors to detect these parameters and other operating conditions of a biochar kiln. In an example as depicted in FIG. 11, a monitor and control subsystem may include a temperature sensor 910 near catalytic converter 700 configured to monitor temperature of smoke at any point(s) upstream and/or downstream from the catalytic converter, temperature of the catalytic converter or a combination of these.

Notification(s) may be transmitted by a transmitter 920 to a portable electronic device 940, for example, in response to the catalytic converter reaching threshold temperature(s) or a range of threshold temperatures. The notification(s) may be, for example, in the form of an alarm or email issued to a plant operator using monitor and control subsystem 930 and may be sent locally and/or wirelessly to remote devices such as smart phones or other electronic devices.

In an example, subsystem 930 may respond by automatically shutting down biochar conversion in one or more biochar kilns.

A feedback loop may be provided as part of the monitor and control subsystem. Sensor output may be used by a programmable logic control (PLC) or other electronic control device. In an example, an average output may be measured from each of the plurality of catalytic converters. The monitored output may be used to check that operation stays in band (e.g. between two thresholds), and adjustments can be made to control air, smoke or both for proper operation of the catalytic converters. The feedback loop may mathematically assign parameters to optimize the motor speed of blowers such as 345 and 590 (e.g., air flow or CFM), damper adjustments or both. In an example, a proportional/integral/derivative (PID) controller may be used to maintain the air-to-smoke ratio within an acceptable range.

A computing subsystem may be used to monitor sensor measurements, e.g., comparing measurements to pre-established threshold(s). In an example, the burn finish condition temperature (e.g., as measured above the catalytic converter) is less than about 80% of normal operating temperatures (e.g., during cook mode) while the secondary air blower is operating at near zero air flow.

Before continuing, it should be noted that the examples described above are provided for purposes of illustration, and are not intended to be limiting. Other system and/or device configurations may be utilized to carry out the operations described herein.

FIG. 12 illustrates a flowchart showing example operations for process monitor and control of a biochar kiln. The operations include, but are not limited to, sensing temperature near a catalytic converter S1100, receiving exhaust from a combustion chamber of the biochar kiln and sensing a temperature in step S1100, comparing the monitored temperature to a threshold in step S1200, the threshold indicating that the catalytic converter has reached a threshold temperature; and issuing a notification in step S1300 in response to a catalytic converter reaching the threshold temperature.

In an example, an auto-shutdown subsystem may be provided in step S1400 to shut down the biochar conversion process even when the biochar kiln is unmanned. For example, automatic shutdown may be enabled by completely closing air inlet ports 240, exhaust inlets 330, chimney 300 or combinations thereof with mechanical or electromechanical actuators to operate shutters or dampers. In an example, sensors may indicate the catalytic converter has decreased to at least 50% of an optimal operating temperature. In an example, a notification issued by the monitor and control system may provide advance warning. In another example, a monitor and control subsystem may detect operating phases of a biochar kiln.

FIGS. 13 & 14 illustrate port covers 400 for the ventilation and exhaust subsystem. Port covers 400 are visible in FIGS. 1, 4, 8, 27 & 28 around the lower circumference of biochar kiln 100 and may be used to control the internal operating conditions. Port covers 400 enable closing off air to the biochar kiln when the conversion process is completed, instead of having to load dirt around the base of the biochar kiln to smother the pyrolysis. Accordingly, covers 400 eliminate the mess and dust often associated with moving dirt around the kiln, in addition to reducing labor and heavy equipment operation. Further, a biochar kiln may be used even when dirt is wet and muddy and/or frozen in colder environments. Because port covers 400 seal the combustion chamber, a kiln may be moved without having to wait for complete extinguishment thus enabling earlier and cleaner transport.

FIG. 14 is an exploded view showing components of an example port cover illustrated in FIG. 13. In this example, a high temperature silicon rubber gasket 440 may be compressed on an end of port pipe 240 into kiln 100. A handle plate weldment 410 provided with fingers 411 and handles 421, and in this example, a seal cover bolt assembly 420 provided with hex bolt 421, washer 422, nut 423 and self-locking nut 424. Cam surfaces on fingers 411 provide axial pressure to air inlet ports 240 as cover 400 is rotated. Port covers 400 further include sealing cover centering guide 430 having flanges 431, sealing cover backing plate 450 and sealing cover center plate 440.

With centering guide 430 and backing plate 450 sealing cover plate 440 floats relative to the clamping cover so as to avoid scrubbing against the sealing surface of port 240 and thereby reduce wear on sealing cover plate 440. Furthermore, cover 400 is encouraged to find its natural center while engaging with pins provided on the kiln exterior. This compensates for the inevitable manufacturing tolerances of pin placement and cam surfaces. Thus, both pins are equally engaged and plate 440 is pressed flat against the sealing surface with equally distributed pressure.

In another example, a lead-in detail (not illustrated) on sealing cover plate 440 may be provided to further assist its centering on ports 240. This makes operation automatic so that the operator does not have to manually drop it into the center position by feel of the fit.

As illustrated in FIGS. 15-28, in an example, an external flow regulation assembly 500 may be coupled with port covers 400 which are, in turn, coupled to collars of air inlet ports 240. Flow regulation assembly 500 provides a butterfly valve including a butterfly disc 570. Rotation of disc 570 about an axis through shaft 575 is enacted by servomotor 580. To completely prevent air flow from outside a kiln, through damper pipe 560 and into a kiln combustion chamber, disc 570 is rotated to a position where its surface normal-line is collinear with the longitudinal axis of pipe 560. To allow maximum flow through pipe 560, disc 570 is rotated 90 degrees from the closed position. Servomotor 580 is capable of rotating disc 570 to any of a variety of angles intermediate between completely closed and completely open. A housing 585 is provided to protect working components of servomotor 580. Further, a shield 567 may be provided between servomotor 580 and a kiln to which assembly 500 is coupled to offer additional protect of servomotor 580 from the heat of the kiln combustion chamber.

A constant speed blower 590 may be provided at the outside end of damper pipe 560 for providing forced air regulated, in part, by assembly 500, a computer controller or both. In another example, blower 590 may provide variable speeds without a damper. In yet another example, a damper may be used without any blower.

Flow regulation assembly 500 can be monitored and controlled by a system such as that illustrated in FIG. 11 to operate servomotors 580 to open and close the air inlet ports 240 based upon the output from one or more sensors 910. Air inlet ports 240 may be opened to provide additional oxygen (e.g., at startup) and closed to reduce oxygen in the combustion chamber. Opening and closing air inlet ports 240 may be immediate (open/close) or gradual during pyrolysis.

Independent control of the opening and closing of air inlet ports 240 allows an operator to provide local fire control in each quadrant. If the overall fire is delivering too much heat, smoke or both to the chimney and catalytic converter, the operator can back off on the kiln fire. Furthermore, with multiple independently controllable air inlet ports 240, if one quadrant of the combustion chamber is burning too strong, an operator or automated controller can limit air in that particular quadrant, increase air to the other quadrants or both to even out the burn.

A threshold may be established to determine closing or gradual closing of air inlet ports with assembly 500. For example, an auto-shutdown system, as described above, may be provided to actuate assemblies 500 (e.g., based on feedback from a temperature sensor, oxygen sensor, and/or weight sensor) and shut down the biochar conversion process even when the biochar kiln is unmanned. An auto-shutdown system may enable the biochar conversion process to be stopped in sufficient time to reduce or eliminate unnecessary burning that would otherwise reduce quantity and/or quality of the yield. In another example, the feedback control loop may issue a notification to a plant operator to manually control damper 570 and blower 590.

As illustrated in FIGS. 29-32, in some example kiln systems, a first forced air inlet 351 may be provided on chimney 300 above one or more catalytic converters 700 to draw smoke through chimney 300 during a preheating stage. For example, a leaf blower or other blower may be connected before chimney 300 is sufficiently hot to draw smoke up therethrough on its own to "prime" chimney 300 while it heats up. In an example, temperature, oxygen sensors or both may be provided and feedback from these sensors may be used to actuate and deactivate a blower provided to forced air inlet 351.

A second forced air inlet 341 may operatively coupled with chimney 300 at any point above or below the one or more catalytic converters 700. Second forced air inlet 341 may be provided to allow for adjusting the air/smoke mixture for optimal catalytic converter operation. Again, a blower 345 coupled with inlet 341 may be activated to increase airflow when air naturally occurring in the smoke stream is insufficient. Blower 345 may be deactivated when there is sufficient air. Different blower speeds may be used on conditions in between. A diffuser, baffle, blade, angling, or other means may be provided inside chimney 300 to cause mixing of the air through turbulence.

The temperature of catalytic converter 700 is controllable with the second forced air inlet 341 and blower 345. If the flow rate of secondary blower 345 is already at maximum and is unable to provide enough air to cool catalytic converter 700, air dampers 570 and blowers 590 at a base of the kiln can be manually or automatically limited to reduce heat and smoke emitted from the combustion chamber and blower 345 motor speed can be reduced.

As volatile organic and other compounds are purged from the feedstock, kiln smoke declines such that catalytic converter 700 requires less secondary air and the blower rate is reduced. When secondary blower speed declines a predetermined amount, the char conversion is deemed to have been completed.

In an example, chimney 300 may include a motorized or manual damper to allow additional flow control. Such a damper may enable controlling the amount of smoke entering chimney 300 and can be used to prevent overwhelming catalytic converters 700 with smoke. As such, both air flow and smoke being exhausted can be controlled, for example, by operation of blowers for air flow, and dampers for smoke exhaust.

Figure 33:
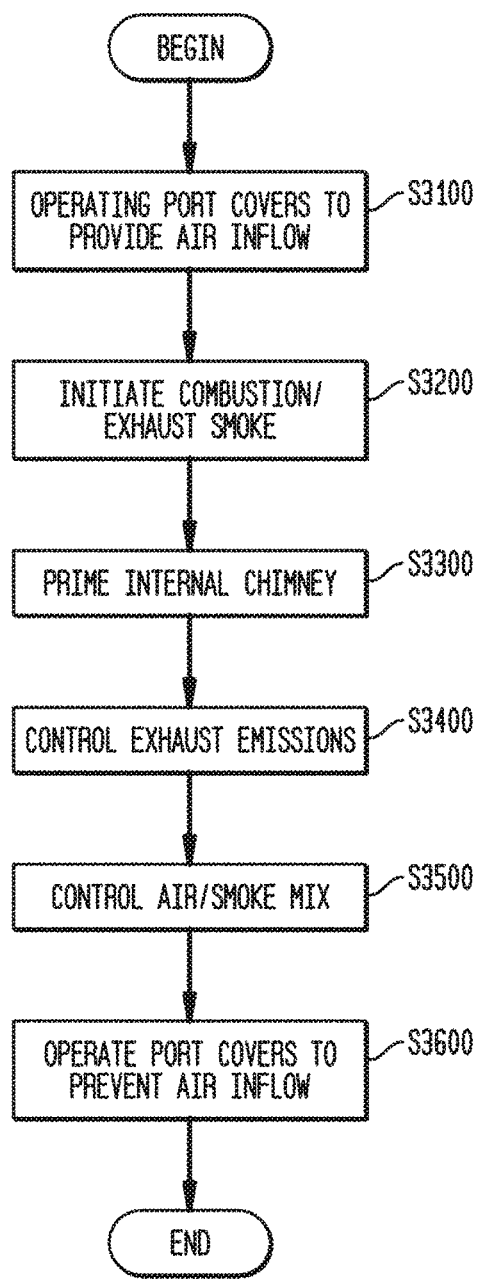
FIG. 33 illustrates a biochar kiln including an example heat exchanger operatively coupled with an exhaust system.

FIG. 33 illustrates a flow diagram of an example exhausting process. Feedstock may be loaded into the kiln and the loaded kiln may be transported to a "firing line". With kiln prepared for pyrolysis, air is provided through air inlet ports 240 to the combustion chamber in step S3100. In an example including a plurality of air inlet ports, air intake is balanced through the plurality of air inlet ports to provide even combustion within the kiln.

Combustion is initiated in the combustion chamber and smoke is exhausted through chimney 300 in step S3200. Chimney 300 is thus heated by pyrolysis in the combustion chamber.

Pyrolysis burns feedstock in the combustion chamber during a cooking stage at temperatures in the range of from approximately 300° C. to approximately 500° C. For example, the temperature of portions of chimney 300 internal to kiln 100 may be about four times hotter than a smoke stack located at the outside of the side on the kiln (e.g., a gradient of 538° C. versus 121° C.). This temperature gradient provides a draft of airflow into the combustion chamber from the air inlet ports, which forces the smoke out through the chimney. The catalytic converter elevates the exhaust or chimney temperature in the range of from approximately 315° C. to approximately 1093° C.

Figure 34:
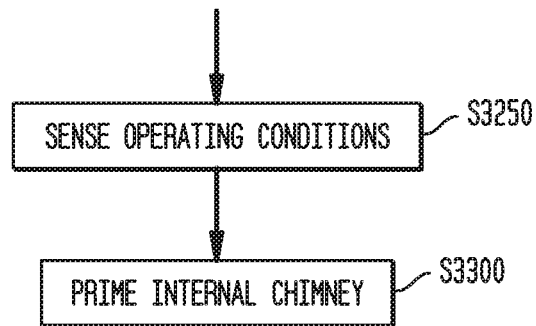
FIG. 34 illustrates a flow diagram of an example exhausting process.

In scenarios wherein the temperature gradient between the lower part of chimney 300 and the upper part of chimney 300 is not sufficient to draw exhaust through chimney 300 and catalytic converter 700, first forced air inlet 341 may be used to prime the chimney 300 during a preheating stage according to step S3300 and draw exhaust until a sufficient temperature gradient has been reached. As illustrated in FIG. 34, operating conditions may be sensed according to step S3250 in order to determine when chimney 300 should be primed in step S3300. Priming the chimney, for example with air inlet 341, may be performed in response to sensing operating conditions of the biochar kiln.

After the preheating stage, the chimney is sufficiently hot that the blower may be turned off, and smoke exhausts from the combustion chamber through the chimney, even in colder operating environments to reduce the amount of smoke exiting from the biochar kiln.

Once exhaust is flowing through chimney 300, exhaust emissions are controlled with one or more catalytic converters 700 in step S3400.

Figure 35:
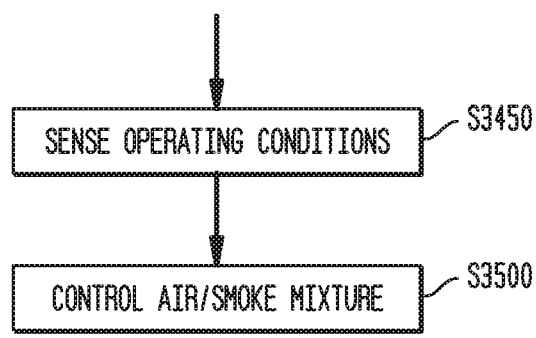
FIG. 35 illustrates a flow diagram of a first control step of an example exhausting process.
Figure 36:
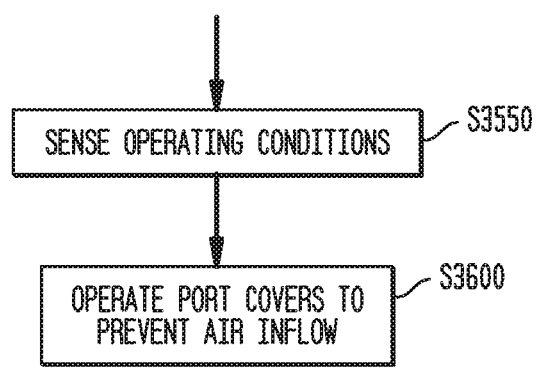
FIG. 36 illustrates a flow diagram of a second control step of an example exhausting process.

During operation of a biochar kiln, the air-to-smoke ratio is carefully controlled in step S3500 to ensure proper operation of the one or more catalytic converters 700. As illustrated in FIG. 35, operating conditions may be sensed according to step S3450 in order to properly control the air/smoke mixture in step S3500. For control, air inlet port covers 400 and assembly 500 are operated to open air inlet ports 240 to provide air to the combustion chamber and to close air inlet ports 240 to prevent air from entering the combustion chamber in step S3600. As illustrated in FIG. 36, one or more operating conditions may be sensed in step S3550 in order to determine the appropriate time for closing of air inlet ports 240 in step S3600.

Before continuing, it should be noted that the examples described above are provided for purposes of illustration, and are not intended to be limiting. Other devices and/or device configurations may be utilized to carry out the operations described herein.

Use of one or more catalytic converters 700 as described above, also enables significant heat recovery for use in secondary applications. As described, the catalytic converter dramatically increases a flue temperature (e.g., about 300%) of chimney 300 without adding more kiln fuel (e.g., wood biomass). This heat is available for external harvesting and storage for later use. Applications which may benefit from the harvested heat may include oil sands hot water used to recover oil from the sands, greenhouses, etc. The secondary subsystem may be an oil sands production water heater, a building heater, or a water condenser or a combination of these. Another application may include using steam to condense air moisture to capture more useable water. This is particularly advantageous in the semi-arid areas containing oil sands.

Heat storage may be implemented using water or steam tanks or other heat storage technology.

Figure 37:
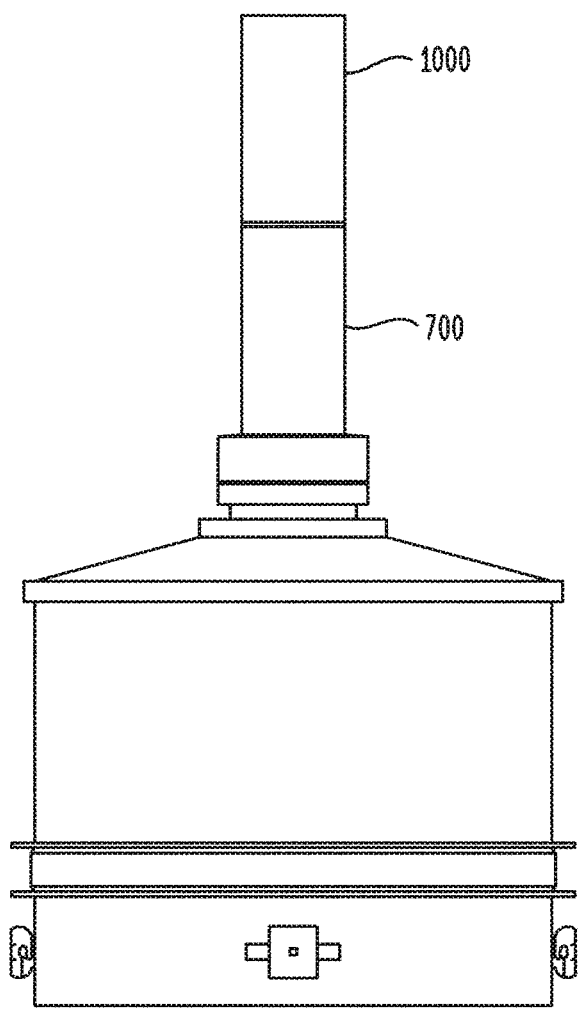
FIG. 37 illustrates a flow diagram of a third control step of an example exhausting process.

In an example illustrated in FIG. 37, A heat exchanger 1000 is configured to recover heat from chimney 300 and provide the heat to a secondary application. In an example, heat exchanger 1000 is configured to exchange heat from one volume of air to another volume of air. In an example, heat exchanger 1000 is configured to exchange heat from a volume of air to a volume of liquid. In an example, heat exchanger 1000 is configured to exchange heat from a volume of air to a volume of steam. Heat exchanger 1000 is in thermal contact with the heat produced in chimney 300.

The above-described monitor and control subsystem may also be configured to control the conditions of the combustion chamber based upon a temperature of a heat exchanger 1000 sensed by one or more sensors 910. A threshold may be used to indicate a temperature change (e.g., that the catalytic converter has reached a predetermined temperature) corresponding with a conditions under which a heat exchanger can be made operational. A notification may be issued in response to the catalytic converter changing to the predetermined temperature (or temperature range) so that proper steps can be taken to ensure heat from the heat exchanger does not adversely affect the secondary applications. For example, the notification may be in the form of an alarm issued to the plant operator and can be sent locally and/or wirelessly to remote devices such as smart phones or other electronic devices so that other heat sources may be brought online/offline to supplement heat from the heat exchanger.

As with previously discussed processes of operating biochar kilns, an optimal mixture of smoke and air is controlled using an automated system including sensors 900 for sensing operating conditions of the heat recovery process. The mixture may be varied by operating forced air inlet(s) to control operating condition(s) of the catalytic converter(s) 700 according to sensed operating conditions.

Figure 38:
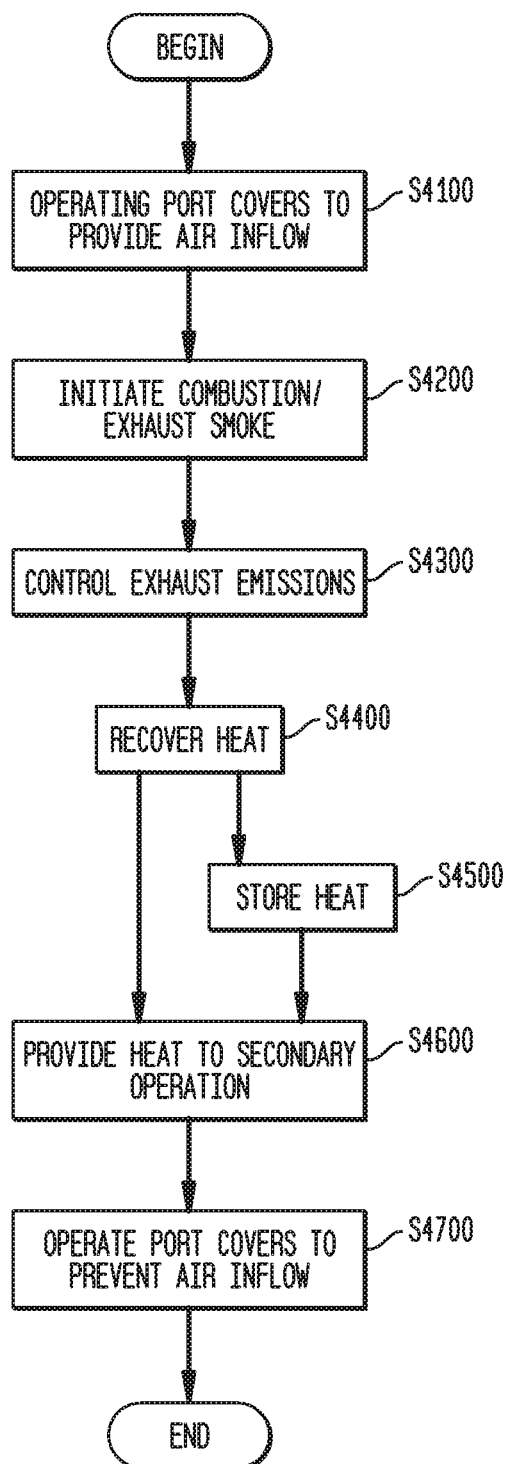
FIG. 38 illustrates a flow diagram of an example heat recovery process.

FIG. 38 illustrates a flow diagram of an example heat recovery process. In steps S4100 and S4200, a biochar kiln is operated to produce exhaust from a combustion chamber. The biochar kiln may be operated near a secondary application at a pyrolysis temperature below approximately 537° C. for biochar production.

Exhaust from the combustion chamber is incinerated using one or more catalytic converters in step S4300. Heat is recovered from the incinerated exhaust with a heat exchanger 1000 in step S4400. Heat may be recovered by exchanging heat from a first volume of air to a second volume of air, exchanging heat from a volume of air to a volume of liquid, exchanging heat from a volume of air to a volume of steam or combinations of these.

After step S4400, heat may be stored according to step S4500 or provided directly to a nearby secondary operation in step S4600. Storing at least some of the heat from the stack temperature for later use may be accomplished using an external water or steam tank or other heat storage technology.

The steps described above may be implemented as methods of operation. By way of example, a method for ventilating and exhausting a biochar kiln may comprise providing air through a plurality of air inlet ports to a combustion chamber; exhausting smoke through an internal chimney provided in the combustion chamber and controlling exhaust emissions with at least one catalytic converter.

The method may further comprise heating the internal chimney by pyrolysis in the combustion chamber. The method may further comprise priming the internal chimney in a preheating stage. Priming the internal chimney may further comprise operating a blower to force air into the internal chimney and draw smoke through the internal chimney during the preheating stage. Priming the internal chimney may further comprise operating the blower in response to sensing operating conditions of the biochar kiln. Providing air through a plurality of air inlet ports further may comprise balancing air intake through the plurality of air inlet ports.

The method may further comprise operating port covers to open the air inlet ports to provide air to the combustion chamber and to close the air inlet ports to prevent air from entering the combustion chamber. The method may further comprise automatically controlling the port covers in response to sensing operating conditions of the biochar kiln. The method may further comprise operating a damper to control an air-to-smoke ratio in the internal chimney. Controlling an air to smoke ratio may further comprise operating a blower to control operating condition(s) of the catalytic converter. Controlling an air to smoke ratio further comprises operating the blower in response to sensing conditions of the catalytic converter.

An example heat recovery process may comprise operating a biochar kiln to produce exhaust from a combustion chamber; incinerating the exhaust with a catalytic converter; recovering heat from the incinerated exhaust with a heat exchanger; and providing the recovered heat to a nearby secondary operation.

The process may further comprise maintaining an optimal smoke/air mixture with a controller. Maintaining an optimal smoke/air mixture may further comprise sensing operating conditions of the heat recovery process. Maintaining an optimal smoke/air mixture may further comprise, using the controller to operate a blower according to sensed operating conditions.

In an example, recovering heat may further comprise exchanging heat from a first volume of air to a second volume of air. Recovering heat may further comprise exchanging heat from a volume of air to a volume of liquid. Recovering heat may further comprise exchanging heat from a volume of air to a volume of steam.

In an example, providing the recovered heat may further comprise providing the recovered heat to one or more of an oil sands production water heater, a building heater, or a water condenser.

In an example, sensing operating conditions may further comprise further comprising at least one of sensing an exhaust temperature, sensing a catalytic converter temperature and sensing a heat exchanger temperature. The process may further comprise storing recovered heat.

The operations shown and described herein are provided to illustrate example implementations. It is noted that the operations are not limited to the ordering shown. Still other operations may also be implemented.

It is noted that the examples shown and described are provided for purposes of illustration and are not intended to be limiting. Still other examples are also contemplated.

The invention claimed is:

1. A biochar kiln exhaust apparatus, comprising:
   a chimney configured for heating by pyrolysis and for exhausting smoke from a combustion chamber; and
   a plurality of exhaust inlet pipes configured to pass smoke from the combustion chamber to the chimney, the exhaust inlet pipes spaced substantially evenly around a base of the combustion chamber to balance air intake from a plurality of air inlet ports of the combustion chamber and direct exhaust from the combustion chamber and toward the chimney.

2. The apparatus of claim 1, further comprising a damper assembly coupled with the chimney and configured to regulate exhaust flow therethrough.

3. The apparatus of claim 1, further comprising a first forced air inlet operatively coupled with the chimney to control at least one operating condition of the chimney.

4. The apparatus of claim 1, further comprising a first air inlet and a second air inlet, both air inlets operatively coupled with the chimney to control at least one operating condition of the chimney.

5. The apparatus of claim 1, further comprising a plurality of air inlet ports around a perimeter of a base of the combustion chamber, each of the plurality of air inlet ports provided for each of the exhaust inlet pipes directing air toward the chimney.

6. The apparatus of claim 5, further comprising a computer-controlled port cover on each of the air inlet ports, each of the computer-controlled port covers independently operable by a servo motor based at least in part on sensor feedback to control an airflow rate through the chimney.

7. The apparatus of claim 5, wherein the arrangement of the plurality of air inlet ports and the exhaust inlet pipes balances air intake from the plurality of air inlet ports regardless of wind conditions outside of the combustion chamber.

8. The apparatus of claim 1, further comprising a first forced air inlet on the chimney with a blower operable to blow air into the chimney and draw air through the chimney.

9. The apparatus of claim 1, further comprising a first forced air inlet on the chimney with a blower automatically operable to blow air into the chimney and draw air through the chimney based on sensor feedback.

10. The apparatus of claim 1, wherein the blower on the first forced air inlet on the chimney is automatically operable to blow air into the chimney and draw air through the chimney based on sensor feedback.

11. A biochar kiln apparatus; comprising:
    a combustion chamber;
    a chimney configured for heating by pyrolysis and for exhausting smoke from the combustion chamber;
    a plurality of exhaust inlet pipes configured to pass smoke from the combustion chamber to the chimney, the exhaust inlet pipes spaced substantially evenly around a base of the combustion chamber to balance air intake for the combustion chamber and direct exhaust through the combustion chamber and toward the chimney; and
    a first forced air inlet on the chimney with a blower operable to blow air into the chimney and draw air through the chimney.

12. The apparatus of claim 11, further comprising a damper assembly coupled with the chimney and configured to regulate exhaust flow therethrough.

13. The apparatus of claim 11, further comprising a plurality of air inlet ports around a perimeter of a base of the combustion chamber, each of the plurality of air inlet ports provided for each of the exhaust inlet pipes directing air toward the chimney.

14. The apparatus of claim 13, further comprising a computer-controlled port cover on each of the air inlet ports, each of the computer-controlled port covers independently operable by a servo motor based at least in part on sensor feedback to control an airflow rate through the chimney.

15. The apparatus of claim 13, wherein the arrangement of the plurality of air inlet ports and the exhaust inlet pipes balances air intake from the plurality of air inlet ports regardless of wind conditions outside of the combustion chamber.

16. A biochar kiln apparatus; comprising:
a combustion chamber;
a chimney configured for heating by pyrolysis and for exhausting smoke from the combustion chamber;
a plurality of exhaust inlet pipes configured to pass smoke from the combustion chamber to the chimney, the exhaust inlet pipes spaced substantially evenly around a base of the combustion chamber to balance air intake for the combustion chamber and direct exhaust through the combustion chamber and toward the chimney; and
a first forced air inlet on the chimney;
a blower operable based on sensor feedback to blow air through the first forced air inlet on the chimney to draw air through the chimney.

17. The apparatus of claim 16, further comprising a damper assembly coupled with the chimney and configured to regulate exhaust flow therethrough.

18. The apparatus of claim 16, further comprising a plurality of air inlet ports around a perimeter of a base of the combustion chamber, each of the plurality of air inlet ports provided for each of the exhaust inlet pipes directing air toward the chimney.

19. The apparatus of claim 18, further comprising a computer-controlled port cover on each of the air inlet ports, each of the computer-controlled port covers independently operable by a servo motor based at least in part on sensor feedback to control an airflow rate through the chimney.

20. The apparatus of claim 18, wherein the arrangement of the plurality of air inlet ports and the exhaust inlet pipes balances air intake from the plurality of air inlet ports regardless of wind conditions outside of the combustion chamber.

* * * * *